(12) United States Patent
Zur Loye et al.

(10) Patent No.: US 6,598,468 B2
(45) Date of Patent: Jul. 29, 2003

(54) APPARATUS AND METHODS FOR DETERMINING START OF COMBUSTION FOR AN INTERNAL COMBUSTION ENGINE

(75) Inventors: Axel O Zur Loye, Columbus, IN (US); Larry J Brackney, Columbus, IN (US); James A Zigan, Versailles, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 09/901,689

(22) Filed: Jul. 11, 2001

(65) Prior Publication Data

US 2003/0010101 A1 Jan. 16, 2003

(51) Int. Cl.$^7$ ................................................. G01L 3/26
(52) U.S. Cl. ..................................................... 73/117.3
(58) Field of Search ...................... 73/116, 115, 117.3; 701/101–102; 123/435, 425

(56) References Cited

U.S. PATENT DOCUMENTS

| | | |
|---|---|---|
| 4,624,229 A | 11/1986 | Matekunas |
| 5,069,183 A | 12/1991 | Nagano et al. |
| 5,274,559 A | 12/1993 | Takahashi et al. |
| 5,458,102 A | 10/1995 | Tomisawa et al. |
| 5,623,412 A | 4/1997 | Masson et al. |
| 5,682,856 A | 11/1997 | Tomisawa et al. |
| 5,765,532 A | 6/1998 | zur Loye |
| 5,832,880 A | 11/1998 | Dickey |
| 5,875,743 A | 3/1999 | Dickey |
| 6,276,334 B1 | 8/2001 | Flynn et al. |
| 6,286,482 B1 | 9/2001 | Flynn et al. |

OTHER PUBLICATIONS

Shigeru Onishi et al., "Active Thermo–Atmosphere Combustion (ATAC)—A New Combustion Process for Internal Combustion Engines", SAE Technical Paper No. 790501, Feb. 26–Mar. 2, 1979.

Masaaki Noguchi et al., "A Study on Gasoline Engine Combustion by Observation of Intermediate Reactive Products during Combustion", SAE Technical Paper No. 790840, Sep. 10–13, 1979.

Paul M. Najt et al, "Compression–Ignited Homogeneous Charge Combustion", SAE Technical Paper No. 830264, (1983).

Michael F.J. Brunt et al., "Calculation of Heat Release in Direct Injection Diesel Engines", SAE Technical Paper No. 1999–01–0187, (1999), pp. 63–76.

Jan–Ola Olsson et al., "Closed–Loop Control of an HCCI Engine", SAE Technical Paper No. 2001–01–1031, Mar. 5–8, 2001.

John B. Heywood, *Internal Combustion Engine Fundamentals*, (1988), McGraw–Hill, pp. 508–514.

J. Ray Smith, et al., "Homogeneous Diesel Combustion", Jun. 18, 1996, pp. 1–4.

"Clean Heavy–Duty Diesel Engine–II Program—Homogeneous Charge Compression Ignition (HCCI) of Diesel Fuel", SWRI Project No. 03–7479, Southwest Research Institute, Nov. 1997.

*Primary Examiner*—Eric S. McCall
*Assistant Examiner*—Maurice Stevens
(74) *Attorney, Agent, or Firm*—Nixon Peabody LLP; Tim L. Brackett, Jr.; Daniel S. Song

(57) ABSTRACT

An apparatus and methods for effectively determining the start of combustion in a cylinder of an internal combustion engine where the start of combustion is calculated by obtaining cylinder pressure data (P), processing the cylinder pressure data (P) into a processed pressure value indicative of the occurrence of SOC, comparing the processed pressure value to a predetermined threshold value, if the processed pressure value crosses the predetermined threshold value, determining that SOC has occurred, and calculating a crank shaft location at which the predetermined threshold value was crossed by the processed pressure value thereby identifying the crank shaft location at which SOC occurred. In alternative embodiments, optional steps may be provided including a verification step, a windowing step, a filtering step, determining occurrence of misfire, and determining occurrence of retarded timing.

101 Claims, 8 Drawing Sheets

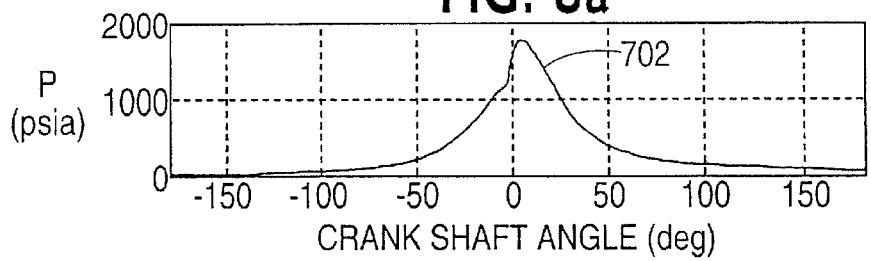
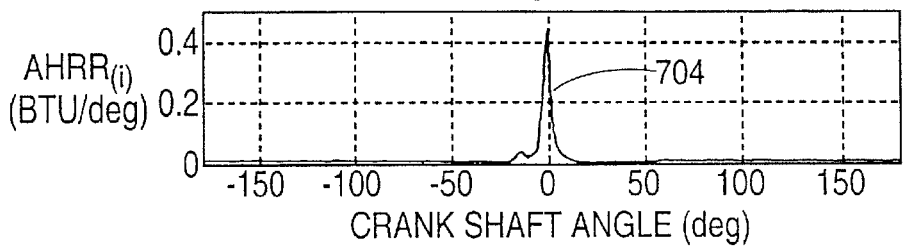
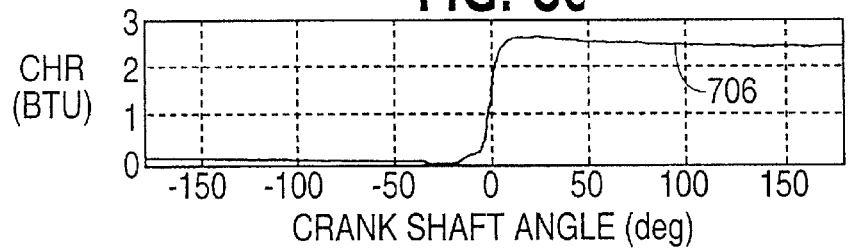
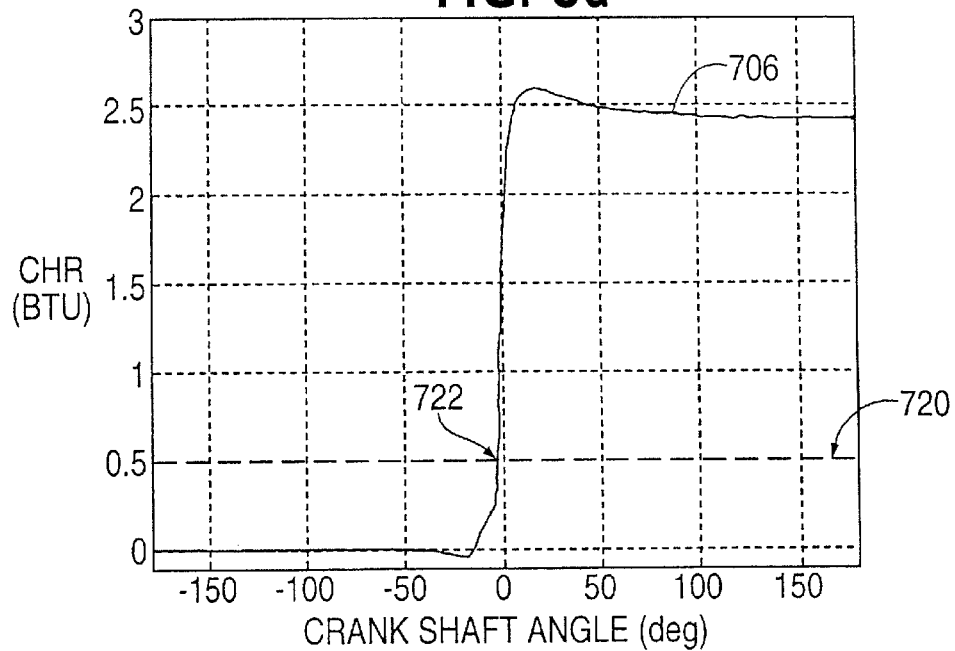

APPARATUS AND METHODS FOR DETERMINING START OF COMBUSTION FOR AN INTERNAL COMBUSTION ENGINE

BACKGROUND OF THE INVENTION

1. Field of the Invention

The present invention relates generally to an apparatus and methods for determining the start of combustion in an internal combustion engine.

2. Description of Related Art

Relatively recently, because of the increased regulatory pressure for fuel efficient and low emissions vehicles, some engine designers have directed their efforts to one type of an internal combustion engine which utilizes premixed charge compression ignition (PCCI). Researchers have used various other names in referencing PCCI combustion including homogeneous charge compression ignition (HCCI) as well as others such as "ATAC" which stands for "Active Thermo-Atmosphere Combustion." (SAE Technical Paper No. 790501, Feb. 26-Mar. 2, 1979), "TS" which stands for "Toyota-Soken" (SAE Technical Paper No. 790840, Sep. 10–13, 1979), and "CIHC" which stands for "compression-ignited homogeneous charge" (SAE Paper No. 830264, 1983). All of these terms are hereinafter collectively referred to as PCCI.

Generally, conventional internal combustion engines are either a diesel or a spark ignited engine, each, to a large extent, controlling the start of combustion (SOC) which has been found to be critical in both efficiency and emissions of internal combustion engines. Initially, it should be understood that SOC refers to combustion phasing where the energy of the fuel is released. In this regard, SOC is commonly referred to as the point in time or crank angle at which a charge within the cylinder begins to ignite or rapidly combusts. The diesel engine controls the SOC by the timing of fuel injection while a spark ignited engine controls the SOC by the spark timing. The major advantage that a spark-ignited natural gas or gasoline engine has over a diesel engine is its ability to achieve extremely low NOx and particulate emissions levels. The major advantage that diesel engines have over premixed charge spark ignited engines is in its higher thermal efficiency. One key reason for the higher efficiency of diesel engines is its ability to use higher compression ratios than premixed charge spark ignited engines since the compression ratio in premixed charge spark ignited engine must be kept relatively low to avoid knock. A second key reason for the higher efficiency of diesel engines lies in the ability to control the diesel engine's power output without a throttle. This eliminates the throttling losses of premixed charge spark ignited engines and results in significantly higher efficiency at part load for diesel engines. Typical diesel engines, however, cannot achieve the very low NOx and particulate emissions levels which are possible with premixed charge spark ignited engines. Due to the mixing controlled nature of diesel combustion, a large fraction of the fuel exists at a very fuel rich equivalence ratio which is known to lead to particulate emissions. Premixed charge spark ignited engines, on the other hand, have nearly homogeneous air fuel mixtures which tend to be either lean or close to stoichiometric, resulting in very low particulate emissions. A second consideration is that the mixing controlled combustion in diesel engines occurs when the fuel and air exist at a near stoichiometric equivalence ratio which leads to high temperatures. The high temperatures, in turn, cause high NOx emissions. Lean burn premixed charge spark ignited engines, on the other hand, burn their fuel at much leaner equivalence ratios which results in significantly lower temperatures leading to much lower NOx emissions. Stoichiometric premixed charge spark ignited engines, on the other hand, have high NOx emissions due to the high flame temperatures resulting from stoichiometric combustion. However, the virtually oxygen free exhaust allows the NOx emissions to be reduced to very low levels with a three-way catalyst.

Unlike these conventional internal combustion engines, engines operating on PCCI principles rely on autoignition of a relatively well premixed fuel/air mixture to initiate combustion. More specifically, in PCCI engines, the fuel and air are mixed in the intake port or in the cylinder, long before ignition occurs. The extent of the mixture may be varied depending on the combustion characteristics desired. Some engines may be designed and/or operated to ensure the fuel and air are mixed into a homogeneous, or nearly homogeneous, state. Also, an engine may be specifically designed and/or operated to create a somewhat less homogeneous charge having a small degree of stratification. In both instances, the mixture exists in a premixed state well before ignition occurs and is compressed until the mixture autoignites. Thus, PCCI combustion event is characterized in that: 1) the majority of the fuel is sufficiently premixed with the air to form a combustible mixture throughout the charge at the time of ignition; and 2) ignition is initiated by compression ignition. In addition, PCCI combustion is also preferably characterized in that most of the mixture is significantly leaner than stoichiometric to advantageously reduce emissions, unlike the typical diesel engine cycle in which a large portion, or all, of the mixture exists in a rich state during combustion. Because an engine operating on PCCI combustion principles has the potential for providing the excellent fuel economy of the diesel engine while providing NOx and particulate emissions levels that are much lower than that of current spark-ignited engine, it has recently been the subject of extensive research and development.

It has been recognized by the applicants of the present invention that the key to producing a commercially viable PCCI engine lies in the control of the combustion history of subsequent or future combustion events in such a manner so as to result in extremely low nitrous oxide (NOx) emissions combined with very good overall efficiency, combustion noise control and with acceptable cylinder pressure. The combustion history may include the time at which combustion occurs (start of combustion), the rate of combustion (heat release rate), the duration of combustion and/or the completeness of combustion. Applicants have determined that the combustion history, and especially the start of combustion (SOC), is sensitive to, and varies depending on, a variety of factors including changes in load and ambient conditions.

In addition, it has also been found by the present applicants that for efficient, low emission PCCI combustion, it is important to have the phasing of combustion or SOC occur properly at an appropriate crank angle during the engine cycle. If combustion starts too early, cylinder pressures will be excessively high and efficiency will suffer. If combustion starts too late, then combustion will be incomplete resulting in poor HC emissions, poor efficiency, high carbon monoxide (CO) emissions, and poor stability. It has further been found that the timing of the start of combustion (SOC) and the combustion rate (therefore combustion duration) in a PCCI engine primarily depend on various combustion history values such as the temperature history; the pressure history; fuel autoignition properties (e.g. octane/methane rating or activation energy); and trapped cylinder charge air composition (oxygen content, EGR, humidity, equivalence ratio etc.).

A premixed charge compression ignition engine with optimal combustion control with various control features for controlling SOC and the combustion rate is disclosed in the patent application Ser. No. 08/916,437 filed on Aug. 22, 1997, currently assigned to the Assignee of the present invention. This application has also been published as International Patent Application No. PCTUS97/14815. As disclosed in the '437 application, it has been found that active control is desirable to maintain the SOC and duration of combustion at the desired location of the crank shaft and at the desired duration, respectively, to achieve effective, efficient PCCI combustion with high efficiency and low NOx emissions.

More specifically, the '437 application discloses a PCCI engine comprising an engine body, a combustion chamber formed in the engine body and combustion history control system for controlling a combustion history of future combustion events to reduce emissions and optimize efficiency. The combustion history control system includes at least one of a temperature control system for varying the temperature of the mixture of fuel and air, a pressure control system for varying the pressure of the mixture, an equivalence ratio control system for varying an equivalence ratio of the mixture and a mixture autoignition property control system for varying an autoignition property of the mixture. The engine further includes an operating condition detecting device for detecting an engine operating condition indicative of the combustion history and generating an engine operating condition signal indicative of the engine operating condition, and a processor for receiving the engine operating condition signal, determining a combustion history value based on the engine operating condition signal, and generating one or more control signals based on the combustion history value. The one or more control signals are used to control at least one of the temperature control system, the pressure control system, the equivalence ratio control system and the mixture autoignition property control system to variably control the combustion history of future combustion events. As also disclosed in the '437 application, the engine operating condition detecting device may include a start of combustion (SOC) sensor for sensing the start of combustion and generating a start of combustion signal. Also, the combustion history value may be determined based on the start of combustion signal. And as further disclosed, the engine operating condition detecting device may also be a cylinder pressure sensor.

However, although SOC can be determined using conventional methods, more effective and efficient apparatus and methods for accurately determining start of combustion are needed to allow more precise control of combustion. Moreover, such an apparatus and methods are required for use in various engines including spark-ignited diesel and alternative fuel engines as well as PCCI engines to allow more effective and accurate control of combustion.

Therefore, there exists an unfulfilled need for an effective and efficient apparatus and method for determining the start of combustion in an internal combustion engine to allow establishing a closed loop control of combustion. Furthermore, there also exists an unfulfilled need for a method of ensuring the integrity of the SOC determinations and a method of determining any occurrence of misfire and existence of retarded timing in the internal combustion engine.

SUMMARY OF THE INVENTION

In view of the foregoing, it is an object of the present invention to provide an effective apparatus and method for determining the start of combustion in an internal combustion engine.

A second object of the present invention is to permit active control of combustion by providing an efficient method for determining the occurrence of start of combustion.

A third object of the present invention is to provide a verification test for ensuring the integrity of the SOC determinations.

Yet another object of the present invention is to provide a method for determining any occurrence of misfire and existence of retarded timing in the internal combustion engine.

In order to permit effective control of the start of combustion (SOC), the timing of the start of combustion should be determined and monitored. It has been found by the present applicants that in certain applications of internal combustion engines such as PCCI engines, SOC may be determined based on a predetermined, well-defined knock/ignition line defining various temperatures and pressures at which combustion will occur. However, applicants' experimental tests show that the SOC is not perfectly repeatable. The applicants have found that SOC varies between each combustion cycle of each cylinder even at same operating conditions over a long period of time, and also varies between each of the cylinders of the engine. This variation in the SOC, between sequential combustion events in a single cylinder engine and between cylinders in a multi-cylinder engine, is due to the sensitivity of PCCI combustion to the pressure and temperature history leading up to the particular combustion event. However, as disclosed in the '437 application, the PCCI engine may be operated to achieve optimum PCCI combustion despite this sensitivity by providing it with features to control various categories of control.

The present inventors have found that one way to effectively implement the previous disclosed optimal combustion control is by establishing a closed loop control using the start of combustion (SOC) as an input to the combustion history control system which may then control any of the control systems to affect the desired SOC. This closed loop control would allow ideal combustion in an internal combustion engine such as ideal PCCI combustion during the operation of the PCCI engine.

In order to establish such a closed loop control, the SOC must be accurately determined and monitored in any given cylinder. Although SOC can be determined using conventional methods, more effective and efficient apparatus and methods for accurately determining start of combustion are needed to allow more precise control of combustion. In addition, there are also no known effective methods for checking the integrity of the SOC determinations. Furthermore, there are also no known effective methods for checking for any misfire in the PCCI engine.

In accordance with preferred embodiments of the present invention, these and other objects are obtained by methods for determining the start of combustion (SOC) in an internal combustion engine including the steps of obtaining cylinder pressure data (P), processing the cylinder pressure data (P) into a processed pressure value indicative of the occurrence of SOC, comparing the processed pressure value to a predetermined threshold value, if the processed pressure value crosses the predetermined threshold value, determining that SOC has occurred, and calculating a crank shaft location at which the predetermined threshold value was crossed by the processed pressure value thereby identifying the crank shaft location at which SOC occurred.

In accordance with alternative embodiments of the present invention, the method may also be provided with optional steps including a verification step, a windowing step, a filtering step, determining occurrence of misfire, and determining occurrence of retarded timing. In this regard, the verification step may be included to ensure integrity of the cylinder pressure data (P). In one embodiment, the verification step includes monitoring continuity of the cylinder pressure data (P) across a bottom dead center boundary of a reciprocally mounted piston in the cylinder. Preferably, a fault signal is provided if the cylinder pressure data across the bottom dead center boundary is not continuous. Alternatively, the verification step may include comparing P measured when a reciprocally mounted piston in the cylinder is at a top dead center position with P measured when the piston is at a bottom dead center position. In this embodiment, the fault signal is provided if the P measured at the top dead center is not substantially greater than the P measured at bottom dead center position.

In one embodiment where the optional step of windowing is provided, the cylinder pressure data (P) is synchronized to an angle of a crank shaft, and the cylinder pressure data (P) is windowed within a predetermined crank shaft angle window which is inclusive of the start of combustion (SOC). In this regard, the predetermined crank shaft angle window may be between −180 and +180 crank shaft degrees from the SOC but is preferably between −10 and +30 crank shaft degrees.

In another embodiment where the optional step of filtering is provided, at least one of the cylinder pressure data (P) and the processed pressure value and may be attained by an analog filter and/or a digital filter. In this regard, the filter may have a cutoff frequency inversely proportional to the bore size of the cylinder of the engine or the bowl size of a piston received within the cylinder of the engine. The filter may alternatively, have a cutoff frequency of approximately 11,000 Hz/(diameter of the cylinder in inches).

In still another embodiment where the occurrence of misfire is optionally determined, the misfire may be determined to have occurred when the processed pressure value does not cross the predetermined threshold within a predetermined crank shaft angle window. A misfire fault signal may be provided upon determining occurrence of misfire, and the SOC crank shaft location may be defined to be a predetermined angle (such as 50 degrees after top dead center position of a piston reciprocally mounted in the cylinder) upon providing said misfire fault signal. In alternative embodiments, the cylinder pressure data (P) may be synchronized to angle of a crank shaft, and the occurrence of misfire may be determined by calculation of a pressure ratio (PR) defined as $PR_{(\theta)}=P_{(\theta)}/P_{(-\theta)}$, where $\theta$ is a crank angle between 10° to 45°, wherein if $PR_{(\theta)}$ is not greater than a reference level which may be one, a misfire is determined to have occurred.

In still another embodiment where the existence of retarded timing is optionally determined, the cylinder pressure data (P) may be synchronized to angle of a crank shaft, and the existence of retarded timing is determined by comparing a pressure ratio (PR) to a predetermined expected PR value, the pressure ratio being defined as $PR_{(\theta)}=P_{(\theta)}/P_{(-\theta)}$, where $\theta$ is a crank angle between 10° to 45°.

In addition, in accordance with various embodiments of the present method, the processed pressure value may be the cylinder pressure itself, a rate of change in the cylinder pressure, an acceleration of the change in the cylinder pressure, or a cumulative heat release value. More specifically, in one embodiment of the present invention, the processed pressure value may be an isentropic compression pressure value. In this regard, the cylinder pressure data (P) may be synchronized to angle of a crank shaft, and the existence of retarded timing may be determined by comparing the cylinder pressure to a predetermined expected isentropic compression pressure value, where if the cylinder pressure is less than the predetermined expected isentropic compression pressure value, determining existence of retarded timing. Moreover, the existence of retarded timing may be determined by comparing a ratio of peak cylinder pressure (PCP) and a pressure earlier in a combustion cycle $P_{(-\theta)}$ to a predetermined expected value or by comparing a pressure ratio (PR) to a predetermined expected PR value, the pressure ratio being defined as $PR_{(\theta)}=P_{(\theta)}/P_{(-\theta)}$, where $\theta$ is a crank angle between 10° to 45°.

In another embodiment of the present method, the cylinder pressure data (P) may be synchronized to angle of a crank shaft, and the cylinder pressure data (P) is processed into a processed pressure value which includes calculation of a pressure change rate. In this regard, the pressure change rate may be $dP/d\theta$ value indicative of rate of change in pressure in the cylinder with respect to an angle of the crank shaft, or may be $dP/dt$ value indicative of rate of change in pressure in the cylinder with respect to time. In addition, the step of processing the cylinder pressure data (P) may further include determining a peak pressure change rate (PPCR) which may then be compared to the predetermined threshold value to determine the SOC. Furthermore, the peak pressure change rate (PPCR) may be compared with a minimum pressure change rate to determine occurrence of misfire if the PPCR is substantially similar to the minimum pressure change rate, or to determine the existence of advanced combustion if the PPCR is substantially greater than the minimum pressure change rate.

In yet another embodiment of the present method, the cylinder pressure data (P) may be synchronized to angle of a crank shaft, and the cylinder pressure data (P) is processed into a processed pressure value which includes calculation of a pressure change acceleration rate. In this regard, the pressure change acceleration rate may be $d^2P/d\theta^2$ indicative of acceleration of pressure in the cylinder with respect to angle of the crank shaft, or $d^2P/dt^2$ value indicative of acceleration of pressure in the cylinder with respect to time. The pressure change acceleration rate may be obtained by processing the cylinder pressure data (P) utilizing a software program executed by a processor, or by processing the cylinder pressure data (P) utilizing a differentiator circuit having an operational amplifier, such as by using two differentiator circuits in series. Additional processing of the pressure change acceleration rate may be provided such as by using a filter, a level shifter, or a comparator, and the step of comparing the processed pressure value to the predetermined threshold value may be attained utilizing a comparator circuit.

In still another embodiment of the present invention, the cylinder pressure data (P) may be synchronized to angle of a crank shaft, and the step of processing the cylinder pressure data (P) into a processed pressure value includes the step of calculating an apparent heat release rate ($AHR_{(i)}$) value in the cylinder based on the cylinder pressure data P, where the $AHRR_{(i)}$ value is indicative of the rate of heat released in the cylinder with respect to angle of the crank shaft. In this regard, a pressure change rate (dP/dθ$_{(i)}$) value indicative of rate of change in pressure in the cylinder with respect to angle of the crank shaft may also be calculated where the apparent heat release rate (AHRR$_{(i)}$) value is calculated based on the dP/dθ$_{(i)}$ value. Preferably, a cumulative heat release (CHR$_{(i)}$) value in the cylinder is calculated based on the AHRR$_{(i)}$ value, the CHR$_{(i)}$ value indicative of cumulative heat released in the cylinder with respect to angle of the crank shaft. The CHR$_{(i)}$ value may then be compared to the predetermined threshold value and if the calculated CHR$_{(i)}$ value crosses the predetermined threshold value, the occurrence of the SOC may be determined. Moreover, the angle of the crank shaft at which SOC occurred can be determined by calculating the angle of the crank shaft at which the predetermined threshold value is crossed.

In accordance with another aspect of the present invention, the above noted objects and others are obtained by an apparatus for determining a start of combustion (SOC) in a cylinder of an engine including a pressure sensing means and a processor. In particular, the pressure sensing means senses pressure in the cylinder and provides a pressure signal indicative of the pressure in the cylinder. The processor receives the pressure signal from the pressure sensing means, processes the pressure signal into a processed pressure signal, compares the processed pressure signal to a predetermined threshold value, determines that SOC has occurred if the processed pressure signal crosses the predetermined threshold value, and calculates crank shaft location at which SOC occurred. In one embodiment of the present invention, the processor may include an electronic control unit (ECU). The pressure sensing means may be one or more of a pressure sensor, accelerometer, ion probe, optical diagnostic, strain gage, load washer, fast thermocouple, torque sensor, RPM sensor and emissions sensor. However, preferably, the pressure sensing means is a pressure sensor. The apparatus in accordance with the present invention may be provided in a diesel engine, a spark ignited engine, a flexible fuel engine, or a premixed charge compression ignition (PCCI) engine, but is especially advantageous when applied to a premixed charge compression ignition (PCCI) engine. In this regard, if the engine to which the present invention is applied includes a combustion history control system, the processor may be used to variably control the combustion history control system based on the calculated SOC.

These and other objects, features and advantages of the present invention will become more apparent from the following detailed description of the preferred embodiments of the invention when viewed in conjunction with the accompanying drawings.

BRIEF DESCRIPTION OF THE DRAWINGS

FIG. 8a graphically illustrates an example of pressure data which may be used to calculate apparent heat release rate values in accordance with one embodiment of the present invention.

FIG. 8b graphically illustrates apparent heat release rate values calculated from the pressure data in FIG. 8a.

FIG. 8c graphically illustrates cumulative heat release values calculated from the apparent heat release rate values in FIG. 8b.

FIG. 8d illustrates an enlarged view of the cumulative heat release graph of FIG. 8c in relation to a predetermined threshold value.

DETAILED DESCRIPTION OF THE PREFERRED EMBODIMENTS

Figure 1:
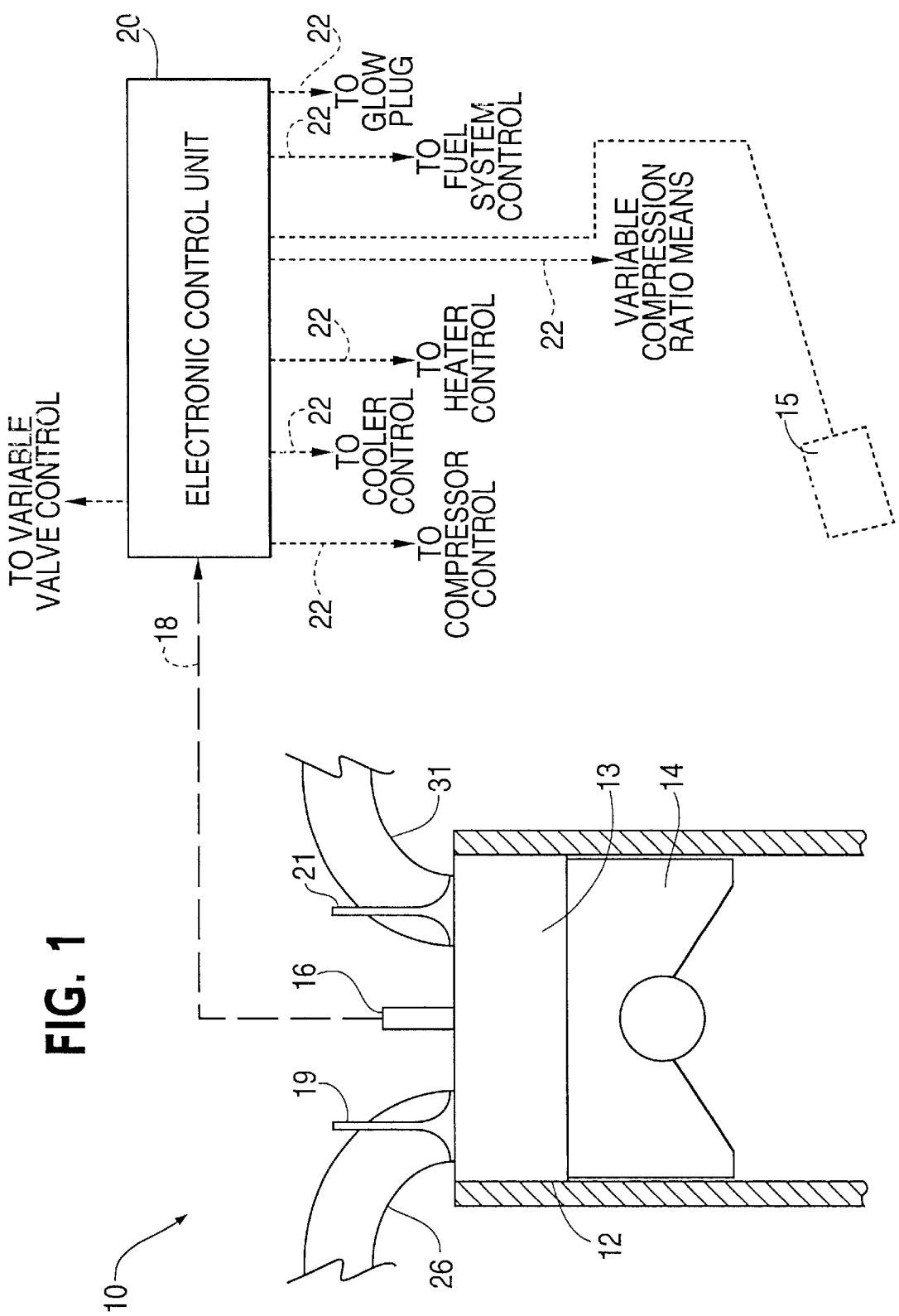
FIG. 1 is a schematic view of a premixed charge compression ignition engine cylinder in accordance with one embodiment of the present invention.

The present invention is directed to a method and apparatus for determining the start of combustion (SOC) in an internal combustion engine to allow maximization of efficiency while minimizing emissions, or for other uses. It should be initially noted that the apparatus and methods in accordance with the present invention disclosed hereinbelow may be applied to various different internal combustion engines including (but not limited to) diesel engines, spark ignited gasoline engines, alternative/flexible fuel engines, and variations thereof which may operate in a modified thermal cycle. The present invention may be used in any of such engines to determine and monitor the SOC to thereby facilitate maximization of engine efficiency while minimizing emissions, or for other uses.

However, it should be clear from the above discussed description of the related art that the present invention is especially applicable to premixed charge compression ignition (PCCI) engines. Consequently, the present invention is described hereinbelow as applied to a PCCI engine but should not be construed to be limited thereto. As previously noted, PCCI refers to any engine or combustion process in which: 1) the majority of the fuel is sufficiently premixed with the air to form a combustible mixture throughout the charge at the time of ignition; and 2) ignition is initiated by compression ignition. More specifically, the present invention provides an apparatus and a method of effectively determining when SOC occurs in an internal combustion engine such as a PCCI engine to thereby allow the establishment of a closed-loop control of the combustion. As previously noted, in the PCCI engine, once this SOC is determined, it can be used to variably control the combustion history control system which may include one or more of a temperature control system for varying the temperature of the mixture of fuel and air, a pressure control system for varying the pressure of the mixture, an equivalence ratio control system for varying an equivalence ratio of the mixture and a mixture autoignition property control system for varying an autoignition property of the mixture as discussed previously.

Thus, as will be evident to one of ordinary skill in the art, the present invention as described herein below allows the determination of SOC in an internal combustion engine utilizing cylinder pressure data by using the cylinder pressure data or processing the data into a rate of change in the cylinder pressure, an acceleration of the change in the cylinder pressure, or a cumulative heat release value in accordance with various embodiments of the present invention as described in further detail below. The determination of SOC allows a closed-loop control of combustion to be established in a PCCI engine or other internal combustion engine to which the present invention is applied. In addition, the present invention also provides an apparatus and methods for optional verification, windowing, and filtering, as well as determination of misfire and retarded timing.

FIG. 1 generally illustrates an example PCCI engine 10 to which one embodiment of the present invention may be applied. Again, it is noted that the present invention may be applied to other types of internal combustion engines but its application to PCCI engine discussed herein because of the great advantages provided by the present invention in PCCI engine applications. As illustrated, a piston 14 is reciprocally mounted in cylinder 12 to form a combustion chamber 13. Intake air/fuel mixture is provided to an intake port 26 through an intake valve 19 into the combustion chamber 13 of each cylinder 12. Likewise, the combustion exhaust is removed from the combustion chamber 13 through the exhaust valve 21 and an exhaust port 31. It should be noted that although only one cylinder is illustrated, the present invention may be utilized in PCCI engines of various configurations including engines having any number of cylinders, for example, a four, five, six, eight, ten, twelve or sixteen cylinder internal combustion engine. The piston 14 transmits forces generated by a combustion event into a conventional engine drive system (not shown) which is generally known in the art. In the present embodiment, the PCCI engine 10 includes a pressure sensor 16 for sensing pressure indicative of the combustion history which may include the time at which combustion occurs (SOC), the rate of combustion, the duration of combustion and/or the completeness of combustion. Thus, in the present embodiments discussed below, the sensed cylinder pressure may be used to accurately determine the start of combustion (SOC). As previously noted, it should be understood that SOC refers to time or location at which rapid combustion starts within the cylinder. Generally, the SOC is referenced with respect to the angular location of an engine crank shaft. Consequently, in the disclosed embodiments discussed hereinbelow, the PCCI engine 10 is also provided with a crank angle sensor 15 which monitors the angular position of the engine crank shaft (not shown) and the SOC is referenced with respect to the crank shaft location. However, in other embodiments of the present invention, the SOC can also be referenced to another parameter such as time, both time and crank shaft location, or some other parameter.

The pressure sensor 16 also generates a corresponding pressure data signal 18 and provides the pressure data signal 18 to a processor such as an electronic control unit (ECU) 20. The pressure sensor 16 may be provided on any or all engine cylinders for sensing, on a cycle-by-cycle basis, the pressure of the cylinder. While in the present embodiment, the pressure sensor 16 provides the pressure data signal 18 which may be used to determine SOC, other cylinder or combustion characteristics may also be measured to determine SOC including the temperature within the cylinder, mechanical stress in the cylinder, etc. Therefore, although in the preferred embodiment, the sensor disclosed is a pressure sensor 16, other sensors may also be used with correlating pressure data. Such sensors include accelerometers, ion probes, optical diagnostics, strain gages, load washers and/or fast thermocouples in or near the cylinder head, liner or piston. Also, torque or RPM sensors could be used to detect changes in engine torque and RPM associated with each combustion event. Alternatively, or additionally, an emissions sensor could be used to detect emissions having a known correlation to the completeness of combustion. Although these sensors do not directly provide cylinder pressure data, these sensors may be used in conjunction with pressure correlation data that provides corresponding cylinder pressure based on the parameter measured by such sensors.

In the present embodiment of FIG. 1, the pressure sensor 16 allows the establishment of a closed-loop feedback control with the ECU 20. The present method of determining start of combustion in a PCCI engine is most preferably implemented by a software program within the ECU 20 which includes a processor such as a micro-controller, micro-processor, or other suitable micro-computing unit. The ECU 20 receives pressure data signal 18, processes the data signal and determines SOC by the present method disclosed hereinbelow. Based on the calculated SOC, the ECU 20 may then generate a plurality of output signals, indicated at 22, for variably controlling components associated with the combustion history control system which may include one or more of a temperature control; pressure control; equivalence ratio control; and control of mixture's autoignition characteristic. The specific details of variably controlling components associated with combustion history control system has been discussed in the patent application Ser. No. 09/255,780 filed on Feb. 23, 1999, this application being currently assigned to the Assignee of the present invention and having also been published as an International Patent Application No. PCT/US99/03289, the entire contents of which is hereby incorporated by reference. As discussed in the incorporated reference, the combustion history control system includes at least one of a temperature control system for varying the temperature of the mixture of fuel and air, a pressure control system for varying the pressure of the mixture, an equivalence ratio control system for varying an equivalence ratio of the mixture and a mixture autoignition property control system for varying an autoignition property of the mixture. As also discussed in the incorporated reference, the foregoing combustion history controls have been found to be very effective in controlling the SOC and the duration of combustion to achieve optimum PCCI combustion. In this manner, a closed-loop control of PCCI combustion can be established to ideally maintain the SOC.

Figure 2:
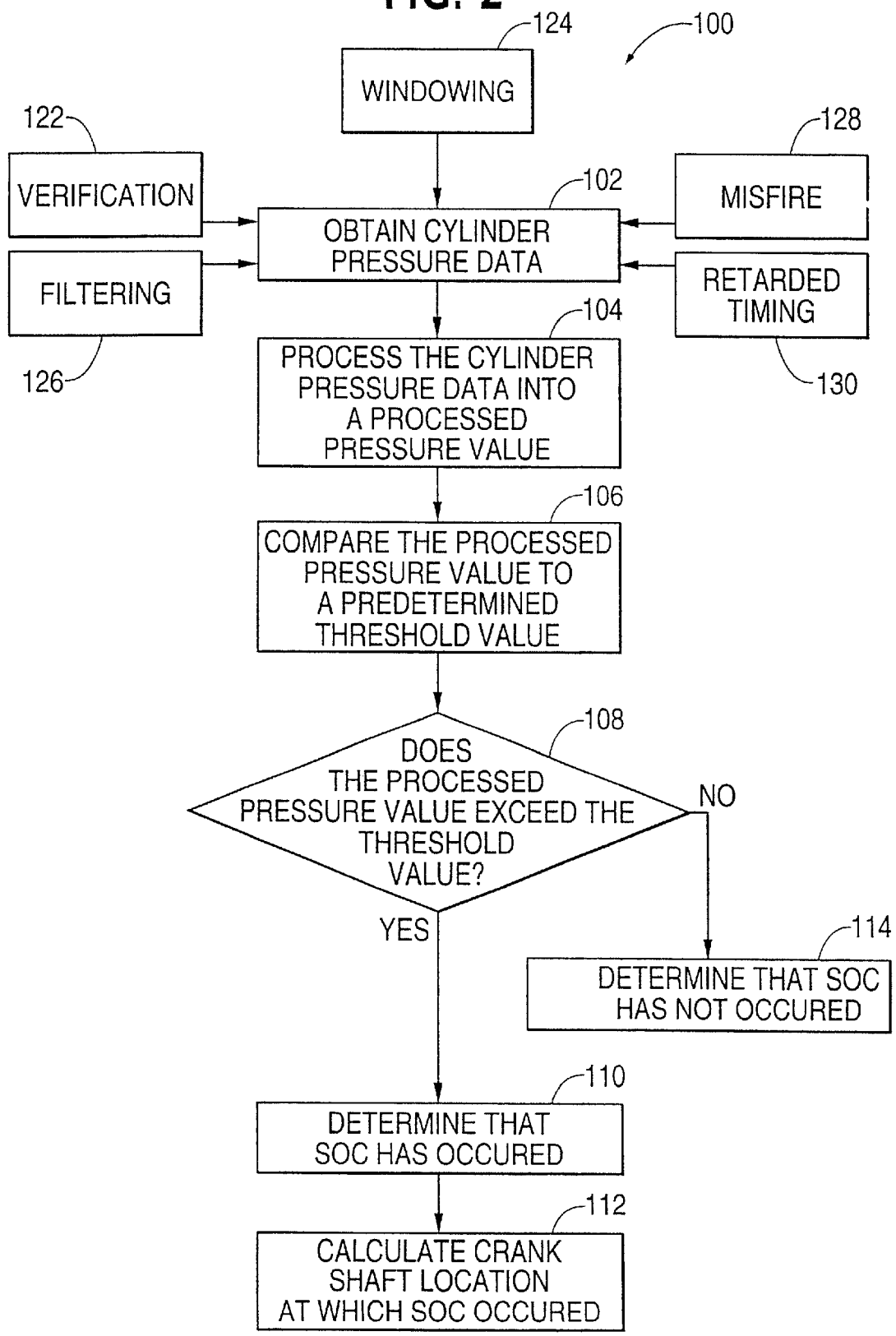
FIG. 2 is a logical flow-chart illustrating one embodiment of the present method of determining start of combustion.

With respect to the present method of determining the start of combustion SOC, it is well recognized in the art that the piston in an internal combustion engine is displaced by pressure caused by combustion of a fuel in a cylinder. In accordance with preferred embodiments of the present invention, the cylinder pressure is then used to determine the start of combustion (SOC) in an internal combustion engine. FIG. 2 shows a logical flow-chart illustrating one embodiment of the present method 100 for determining start of combustion SOC. As can be seen, the present method 100 includes step 102 of obtaining cylinder pressure data (P) in the manner previously described such as by using the pressure sensor 16 of FIG. 1 or by using a different sensor together with correlating pressure data. The obtained cylinder pressure data (P) of step 102 is processed into a processed pressure value in step 104, the processed pressure value being indicative of the occurrence of SOC. The processed pressure value of step 104 is then compared to a predetermined threshold value in step 106. In the decision step 108, it is determined whether the processed pressure value of step 104 crosses the predetermined threshold value. If the processed pressure value crosses the predetermined threshold value, the present method 100 determines that SOC has occurred as shown in step 110, and calculates a crank shaft location at which the predetermined threshold value was crossed by the processed pressure value thereby identifying the crank shaft location at which SOC occurred as shown in step 112. If however, the processed pressure value does not cross the predetermined threshold value, the present method 100 determines that SOC has not yet occurred as shown in step 114. The various embodiments of the present method 100 utilize pressure data to determine the SOC and the pressure data may be acquired various ways as noted previously. In accordance with the various preferred embodiments of the present invention, the processed pressure value in step 104 may be the cylinder pressure itself, a rate of change in the cylinder pressure, an acceleration of the change in the cylinder pressure, or a cumulative heat release value, each of these embodiments being discussed in further detail herein below. It should be noted that whereas only one processed pressure value would be needed to determine the SOC in accordance with the present method 100, the cylinder pressure data obtained in step 102 may be further processed so that more than one processed pressure value can be obtained and compared in the manner described below which will provide an even more robust and accurate determination of SOC.

In accordance with the present method 100, the processed pressure value of step 104 is compared to a corresponding predetermined threshold value in step 106. Thus, if the processed pressure value is the cylinder pressure itself, the predetermined threshold value to which it is compared may be an isentropic compression pressure value. If the processed pressure value is a rate of change in the cylinder pressure, the predetermined threshold value to which it is compared may be a minimum pressure change rate. Likewise, if the processed pressure value is an acceleration of the change in the cylinder pressure, the predetermined threshold value to which it is compared may be a minimum acceleration rate. Lastly, if the processed pressure value is a cumulative heat release value (CHR), the predetermined threshold value to which it is compared may be a minimum CHR value. As can be seen from FIG. 2, if the processed pressure value of step 104 does not cross the corresponding predetermined threshold value, SOC is determined to have occurred as shown in steps 108 and 110. Specific examples of the present method 100 generally illustrated in FIG. 2 are further described in detail below with respect to the other figures.

FIG. 2 also illustrates various optional steps that may be provided in the present method 100. In particular, as can be clearly seen, the present method 100 may also be provided with optional steps including a verification step 122, a windowing step 124, a filtering step 126, step 128 that determines occurrence of misfire, and step 130 that determines occurrence of retarded timing. It should initially be noted that the present method 100 as shown is merely one example and that the steps are optional and need not be provided. In addition, whereas the embodiment of the present method 100 as illustrated in FIG. 2 shows the provision of all of these optional steps, each of these steps are independent of each other so that one or more may be provided without the other steps, in any combination. Moreover, whereas these optional steps are illustrated as being provided during the step 102 of obtaining cylinder pressure data, in other embodiments, one or more of these optional steps may be provided at other steps in the present method 100, in any combination.

More specifically, the optional verification step 122 may be included in the present method 100 to ensure integrity of the cylinder pressure data (P). In accordance with one embodiment, the verification step 122 includes monitoring continuity of the cylinder pressure data (P) across a bottom dead center boundary of the reciprocally mounted piston 13 in the cylinder 12 shown in FIG. 1. Preferably, a fault signal is provided by the ECU 20 if the cylinder pressure data across the bottom dead center boundary is not continuous. Alternatively, in another embodiment, the verification step 122 may include comparing P measured when the reciprocally mounted piston 14 in the cylinder 12 is at a top dead center position with P measured when the piston 14 is at a bottom dead center position. In this embodiment, the fault signal is preferably provided if the P measured at the top dead center is E not substantially greater than the P measured at bottom dead center position. For instance, the fault signal may be provided if P measured at the top dead center is not at least four times greater than the P measured at bottom dead center position. In this manner, the verification step 122 may be provided to ensure integrity of the cylinder pressure data (P) during the present method 100.

The optional windowing step 124 may be provided in the present method 100 to minimize data acquisition and processing requirements as well as to enhance the accuracy of the SOC determination in steps 106, 107 and 108 as will be further explained relative to a specific example below. To allow such windowing, the cylinder pressure data (P) is synchronized to an angle of a crank shaft. The cylinder pressure data (P) as obtained in step 102 is windowed within a predetermined crank shaft angle window which is inclusive of the start of combustion (SOC). The term "windowing" is meant to convey that the cylinder pressure data in step 102 is obtained only within the desired "window" or range of crank shaft angle. Thus, rather than obtaining cylinder pressure data in step 102 for the full 720 crank shaft degrees (for a 4 cycle engine), the obtaining of cylinder pressure data is limited or "windowed" to a predetermined range such as between −180 and +180 crank shaft degrees from the expected SOC. In this regard, because SOC generally occurs near top dead center (compression) position of the piston 14, the present inventors have found that windowing within a range between −50 and +50 crank shaft degrees from the top dead center (compression) position to be adequate for determining SOC in accordance with the present invention. Moreover, if processing resources of the ECU 20 is limited, the windowing step 124 may even further limit the obtaining of cylinder pressure data in step 102 to between −10 and +30 crank shaft degrees from the top dead center (compression). In the above described manner, the optional windowing step 124 may be provided in the present method 100 to minimize data acquisition and processing requirements.

The optional filtering step 126 may be provided in accordance with another embodiment of the present invention to filter the cylinder pressure data (P) obtained in step 102 or to filter the processed pressure value of step 106. As can be seen, in the illustrated embodiment of FIG. 2, the filtering step 126 filters the cylinder pressure data (P) obtained in step 102 which facilitates the processing of the cylinder pressure data (P) into the processed pressure value, this value then being compared to a predetermined threshold value in step 106. Such an embodiment and the advantages of such filtering is discussed in further detail below relative to a specific example. The filtering step 126 may be attained by an analog filter and/or a digital filter (not shown). In this regard, the present inventors have found that filters having a cutoff frequency inversely proportional to either the bore size of the cylinder of the engine or the bowl size of a piston received within the cylinder of the engine is desirable in such applications to be effective in facilitating the processing of the cylinder pressure data (P) into the processed pressure value. In addition, filters having cutoff frequency of approximately 11,000 Hz/(diameter of the cylinder in inches) have also been found to be effective in this regard as well. In the present application, this correlated to 2500 Hz. Of course, this cutoff frequency would be different in other applications where the cylinder bore diameter is different.

As also previously noted above, the optional step 128 of determining the occurrence of misfire may also be provided. In one embodiment, the cylinder pressure data (P) obtained in step 102 may be synchronized to angle of the crank shaft, and the occurrence of misfire may be determined in step 128 by calculation of a pressure ratio (PR) which may be defined as $PR_{(\theta)}=P_{(\theta)}/P_{(-\theta)}$ in one preferred embodiment, where $\theta$ is a crank angle between 10° to 45° from top dead center (combustion) position of the crank shaft. Calculation of pressure ratio (PR) is known in the art as evidenced by U.S. Pat. No. 5,765,532 to Loye which is incorporated herein by reference. In typical combustion cycles, $PR_{(\theta)}$ would be greater than one since combustion increases the pressure in the combustion chamber 13 of the cylinder 12 to a level greater than the compression pressure prior to combustion. Thus, in this embodiment, if $PR_{(\theta)}$ is not greater than a reference level such as one, a misfire is determined to have occurred. Of course, it should be evident to one of ordinary skill in the art that in other embodiments of the present invention, other pressure ratios can be used, for instance $PR_{(\theta)}=P_{(\theta 1)}/P_{(\theta 2)}$. A misfire fault signal may then be provided and upon providing the misfire fault signal, the SOC crank shaft location may be defined to be a predetermined angle, such as 50 degrees after top dead center position. In alternative embodiments, the optional misfire step 128 may be executed after the comparison step 106 where the misfire may be determined to have occurred when the obtained cylinder pressure data (P) of step 102 or the processed pressure value of step 104 does not cross the predetermined threshold within a predetermined crank shaft angle window which may be the same or different window as that of the optional windowing step 124. Thus, for example, if the obtained cylinder pressure data (P) does not cross the predetermined threshold between −10 and +30 crank shaft degrees from the top dead center (compression), it may be determined that misfire occurred.

In a similar manner, the optional step 130 of determining the existence of retarded timing may also be provided in accordance with the present method 100 as illustrated in the embodiment of FIG. 2. In such an optional step 130, the cylinder pressure data (P) may be synchronized to the angle of a crank shaft, and the existence of retarded timing may be determined by comparing a pressure ratio (PR) to a predetermined expected PR value, the pressure ratio being defined as $PR_{(\theta)}=P_{(\theta)}/P_{(-\theta)}$, where $\theta$ is a crank angle between 10° to 45°. The expected PR value may be empirically predetermined based on the combustion characteristics of the particular engine application so that if the pressure ratio $PR_{(\theta)}$ deviates significantly from the expected PR value, retarded timing is determined to exist. It should of course, be appreciated that the expected PR value as well as the tolerable deviance of the $PR_{(\theta)}$ relative to the expected PR value depends largely on the particular engine application as well as the crank angle $\theta$ used.

Again, it should be noted that the above described steps including the verification step 122, the windowing step 124, the filtering step 126, step 128 that determines occurrence of misfire, and step 130 that determines occurrence of retarded timing are all optional and may be provided individually from one another in any combination. Moreover, as also previously noted, the present method 100 as shown in FIG. 2 is merely one example of the present invention and other embodiments are possible. In this regard, details of various specific embodiments of the present invention are discussed herein below, especially with respect to the various embodiments of the present method where the processed pressure value may be the cylinder pressure itself, a rate of change in the cylinder pressure, an acceleration of the change in the cylinder pressure, or a cumulative heat release value.

Figure 3:
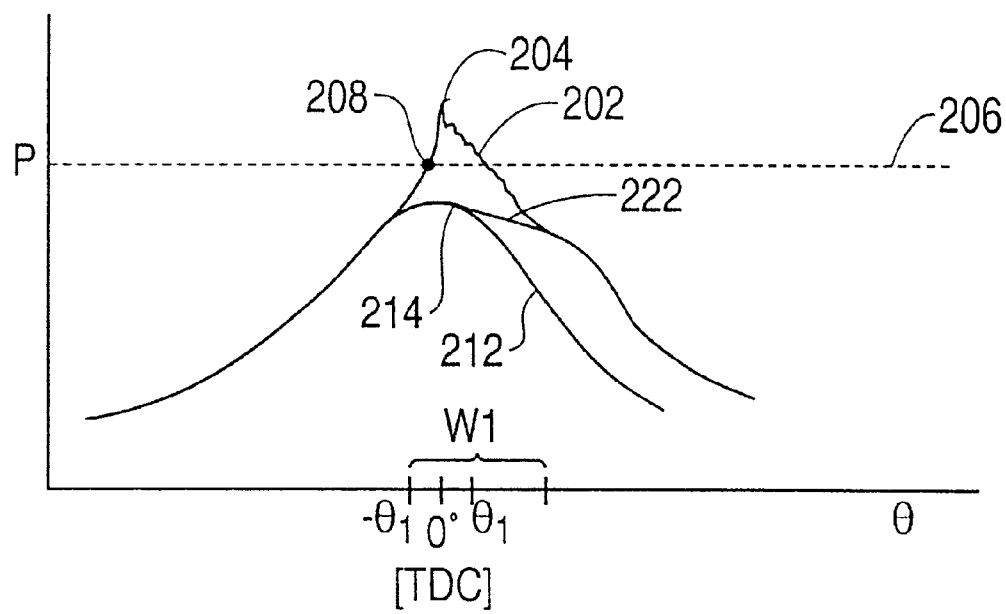
FIG. 3 graphically illustrates one embodiment of the present invention where the processed pressure value is the cylinder pressure and also illustrates the optional steps of determining misfire and existence of advanced timing.

FIG. 3 graphically illustrates various aspects of one embodiment of the present invention where the processed pressure value is the cylinder pressure itself as well as the optional steps of determining misfire and existence of advanced timing. In particular, the graph of FIG. 3 illustrates various cylinder pressure P (y-axis) along the various crank angles $\theta$ (x-axis) during a combustion cycle in the cylinder 12 of the engine 10 of FIG. 1. Line 202 illustrates cylinder pressure (P) of normal combustion within the cylinder 12 which obtains the peak cylinder pressure (PCP) at point 204 which is located at approximately zero crank degrees, i.e. top dead center (compression), or slightly thereafter. Thus, in accordance with the present embodiment, a predetermined threshold value indicated by the dashed line 206 may be provided so that when the pressure in the cylinder crosses the predetermined threshold value, SOC is determined to have occurred, such as at point 208. FIG. 3 also illustrates line 212 which represents the cylinder pressure characteristics during the occurrence of misfire. As can be seen, the peak cylinder pressure PCP indicated by numeral 214 on the misfire line 212 does not cross the predetermined threshold value indicated by the dashed line 206 and thus, it can be determined that combustion has not occurred or SOC occurred too late. By determining that processed pressure value (i.e. the PCP) of step 104 does not cross the predetermined threshold within a predetermined crank shaft angle window W1, the occurrence of misfire can be determined. Of course, the determination of misfire can be attained in the manner also discussed previously by calculating the pressure ratio PR as well. FIG. 3 further illustrates line 222 which represents the cylinder pressure characteristics during the existence of retarded timing. As previously described, the existence of retarded timing can be determined by comparing a pressure ratio (PR) to a predetermined expected PR value. In the illustrated embodiment, it can be appreciated that the $P_{(\theta 1)}=P_{(\theta 1)}/P_{(-\theta 1)}$ (i.e. at $\theta_1$) is approximately one for the retarded timing line 222 whereas for the normal combustion line 202, $PR_{(\theta 1)}$ is greater than 1. Thus, by comparing the PR value to an expected PR value of normal combustion line 202, it can be determined that retarded timing exists.

Figure 4:
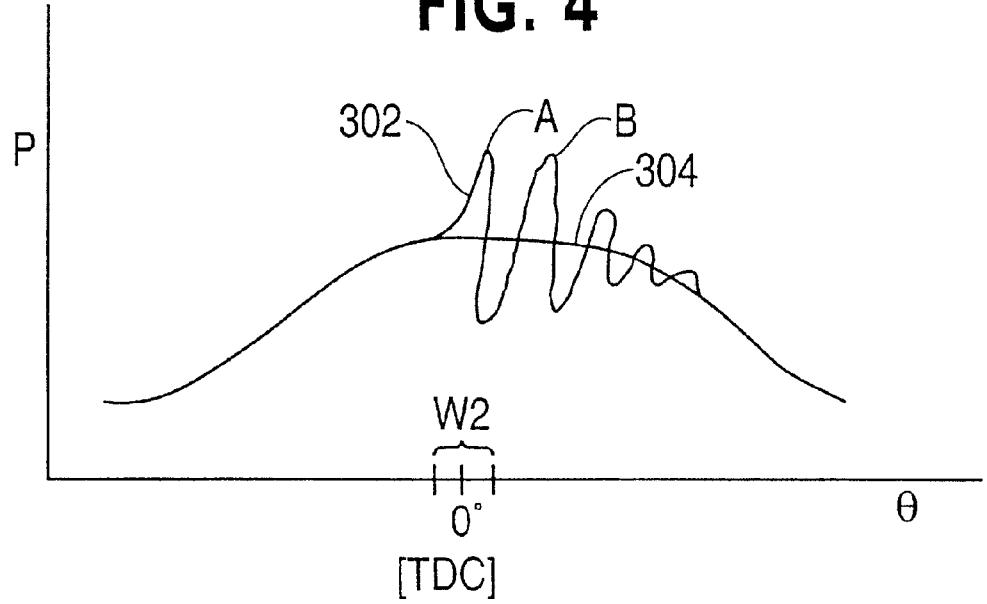
FIG. 4 graphically illustrates the application of the optional filtering step and windowing in accordance with the present invention.

FIG. 4 graphically illustrates the application of the optional filtering step 126 shown in FIG. 2 in accordance with the present method 100, again illustrating the cylinder pressure P (y-axis) along the various crank angles θ (x-axis) during a combustion cycle. The present inventors have found that in certain internal combustion engines such as PCCI engines, a significant amount of pressure "ringing" may occur during combustion as exemplified by the oscillating pressures shown in line 302 of FIG. 4. In this regard, line 302 may have multiple peaks as shown including peaks A and B which can be both interpreted as indicating SOC since peaks A and B will cross the predetermined threshold value in the manner described relative to FIG. 3. In accordance with the present embodiment, to alleviate the "ringing" problem and the oscillating pressures as shown in line 302, the cylinder pressure data P obtained may be filtered to thereby provide filtered line 304 which does not have the oscillations. Because the filtered line 304 does not have multiple peaks as the unfiltered line 302, the filtered line 304 can be compared to a predetermined threshold value to determine that SOC has occurred if the filtered line 304 crosses the predetermined threshold value.

In addition to the above, FIG. 4 also exemplifies another application of the optional windowing step 124 of FIG. 2 in accordance with the illustrated embodiment of the present method 100. In particular, if the obtaining of cylinder pressure data is windowed to the limited crank angle θ range indicated by W2 in FIG. 4, there will only be one peak (namely peak A) that will be processed into the pressure value and compared to the predetermined threshold value as described above. Thus, the oscillating pressure problem associated with ringing in certain internal combustion engines such as PCCI engines can be effectively dealt with while minimizing the processing requirements of the electronic control unit 20 of FIG. 1. As previously described, the filtering step 126 may be attained by an analog filter and/or a digital filter having a cutoff frequency inversely proportional to either the bore size of the cylinder of the engine or the bowl size of a piston, or approximately 11,000 Hz/ (diameter of the cylinder in inches) which in the present application was 2500 Hz.

Figure 5:
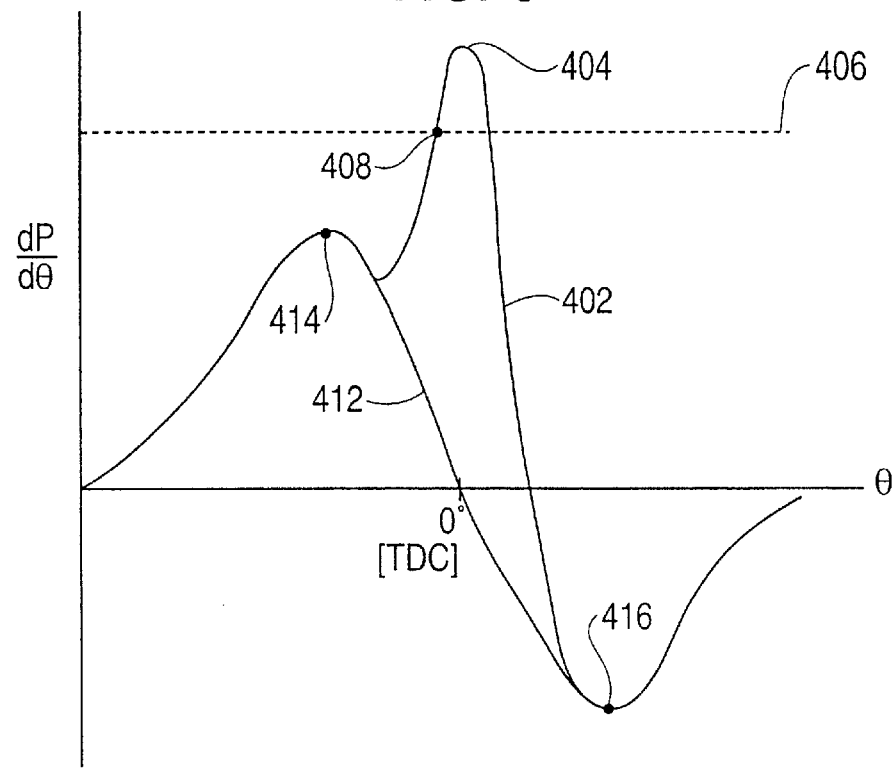
FIG. 5 graphically illustrates another embodiment of the present invention where the processed pressure value is a pressure change rate dP/dθ indicative of rate of change in pressure in said cylinder with respect to an angle of a crank shaft.

FIG. 5 graphically illustrates various aspects of another embodiment of the present invention where the processed pressure value is a rate of change in the cylinder pressure and the cylinder pressure data (P) is synchronized to an angle of a crank shaft. As can be seen, the rate of change in the illustration is dP/dθ value indicative of rate of change in pressure in the cylinder with respect to an angle of the crank shaft. As can be seen, FIG. 5 graphs the rate of change in the cylinder pressure dP/dθ (y-axis) along the various crank anglesθ (x-axis) during a combustion cycle in the cylinder 12 of the engine 10 of FIG. 1. However, it should be noted that the rate of change may also be a dP/dt value indicative of rate of change in pressure in the cylinder with respect to time, in which case, the x-axis would be time. Line 402 illustrates dP/dθ of normal combustion within the cylinder 12 which obtains the peak pressure change rate (PPCR) at point 404 which is located at approximately zero crank degrees, i.e. top dead center (compression), or slightly thereafter. Thus, in accordance with the present embodiment, a predetermined threshold value such as a predetermined dP/dθ value indicated by the dashed line 406 may be provided so that when dP/dθ in the cylinder crosses the predetermined threshold value, SOC is determined to have occurred, such as at point 408.

FIG. 5 also illustrates line 412 which represents the cylinder dP/dθ characteristics during the occurrence of misfire. As can be seen, the peak pressure change rate PPCR indicated by numeral 414 on the misfire line 412 does not cross the predetermined threshold value indicated by the dashed line 406 and thus, it can be determined that SOC has not occurred. In addition, by windowing or by calculating the PR value in the manner described above relative to FIG. 3, occurrence of misfiring can be determined. Furthermore, it should also be noted relative to the present embodiment that misfiring can also be determined by looking at the amplitude of the maximum dP/dθ (i.e. PPCR) and the amplitude of the minimum dP/dθ. The present inventors have found that during misfire, the amplitude of the maximum dP/dθ is substantially the same as the amplitude of the minimum dP/dθ. Thus, as can be seen in FIG. 5, the amplitude of the maximum dP/dθ as indicated by point 414 is substantially the same as the amplitude of the minimum dP/dθ indicated by point 416. The peak pressure change rate PPCR (i.e. maximum dP/dθ) may also be compared with the minimum dP/dθ to determine the existence of advanced combustion if the PPCR is substantially greater than the minimum dP/dθ. Moreover, it is again noted that the rate of change may also be a dP/dt value indicative of rate of change in pressure in the cylinder with respect to time.

Figure 6:
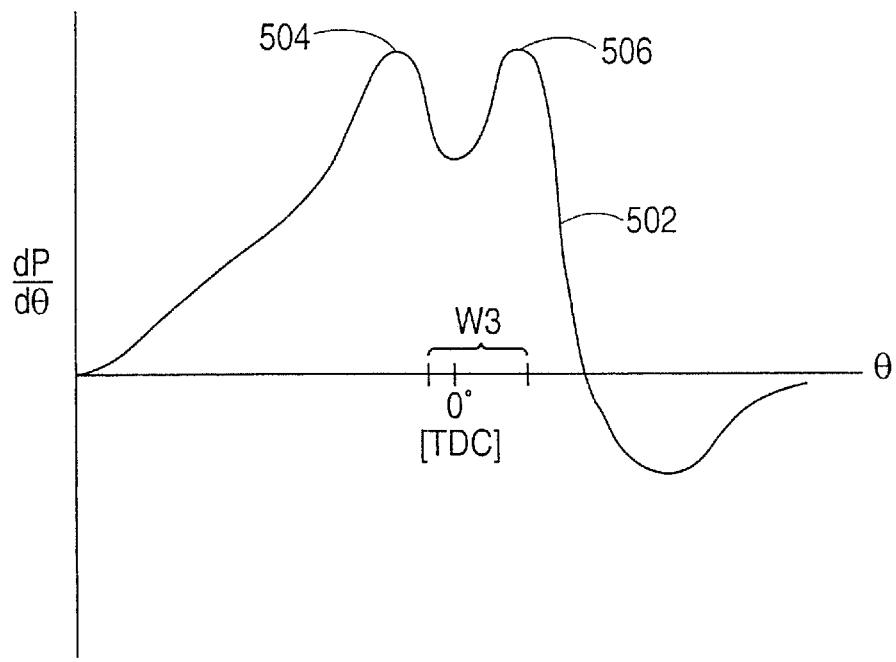
FIG. 6 graphically illustrates the application of the optional windowing step in accordance with the present invention.

Line 506 of FIG. 6. illustrates the characteristics of dP/dθ when the combustion is very slow. As can be seen, line 502 has two peaks at points 504 and 506, both of which can cross the predetermined threshold value. To find SOC which actually correlates to one of the two peaks, the previously described windowing step may be provided. Thus, in the illustrated embodiment of FIG. 6, the windowing step may limit dP/dθ within the window W3 thereby ensuring the detection and basing the SOC determination on the peak 506 instead of the peak 504 (or vice versa) which may be an improper peak depending on the application. In such instances, the present inventors have found that window W3 between −10 to 30 crank shaft degrees served to adequately isolate the proper peak which is indicative of SOC.

In yet another embodiment of the present method, the cylinder pressure data (P) may be synchronized to angle of a crank shaft, and the cylinder pressure data (P) may be processed into a processed pressure value which includes calculation of a pressure change acceleration rate. In this regard, the pressure change acceleration rate may be $d^2P/d\theta^2$ indicative of acceleration of pressure in the cylinder with respect to angle of the crank shaft, or $d^2P/dt^2$ value indicative of acceleration of pressure in the cylinder with respect to time. The pressure change acceleration rate may be obtained by processing the cylinder pressure data (P) utilizing a software program executed by a processor, or by processing the cylinder pressure data (P) utilizing a differentiator circuit having an operational amplifier, such as by using two differentiator circuits in series. Additional processing of the pressure change acceleration rate may also be provided, for instance, by using a filter, a level shifter, or a comparator, and the step of comparing the processed pressure value to the predetermined threshold value may be attained utilizing a comparator circuit known in the art.

As also previously noted, in still another embodiment of the present method 100 shown in FIG. 2, the cylinder pressure data (P) may be synchronized to angle of a crank shaft, and the SOC determined by processing the cylinder pressure data obtained in step 102 of FIG. 2 into a $CHR_{(i)}$ value indicative of cumulative heat released in the cylinder with respect to angle of the crank shaft, and comparing the $CHR_{(i)}$ value to a predetermined threshold CHR value in step 106. Preferably, the cumulative heat release ($CHR_{(i)}$) value in the cylinder is calculated based on an apparent heat release rate ($AHRR_{(i)}$) value in the cylinder where the $AHRR_{(i)}$ value is indicative of the rate of heat released in the cylinder with respect to angle of the crank shaft. The $AHRR_{(i)}$ value can be calculated based on the cylinder pressure data P by calculating a pressure change rate ($dP/d\theta_{(i)}$) value indicative of rate of change in pressure in the cylinder with respect to angle of the crank shaft. Because of the correlation between cylinder pressure and the heat released, the present applicants recognized that cylinder pressure data corresponding to crank shaft angle may be used to calculate the rate of change of the cylinder pressure. This pressure change rate which is a function of pressure and crankshaft angle (among others) was recognized to be correlated to an apparent heat release rate (AHRR) value so that it can be used to compute the AHRR. It should be noted that the AHRR value is a computed, theoretical value based upon the physical relationship between the cylinder pressure and an actual heat release rate which, based on the existing level of technology, is difficult to measure accurately and quickly. The AHRR value is then used to calculate a quantitative sum identified as a cumulative heat release (CHR) value which is indicative of the amount of heat released at a particular given angular location of the crank shaft. Because CHR is cumulative, the CHR value generally continuously increases as the combustion event is continued and the crank shaft rotation angle progresses. Then, the crank shaft angle at which the CHR value crosses a predetermined threshold value is determined to be the start of combustion (SOC) as provided in steps 106 and 108 of the embodiment of the present method 100 shown in FIG. 2. The details of embodiments in which the cylinder pressure data is processed into a CHR value to determine SOC is discussed herein below.

Figure 7:
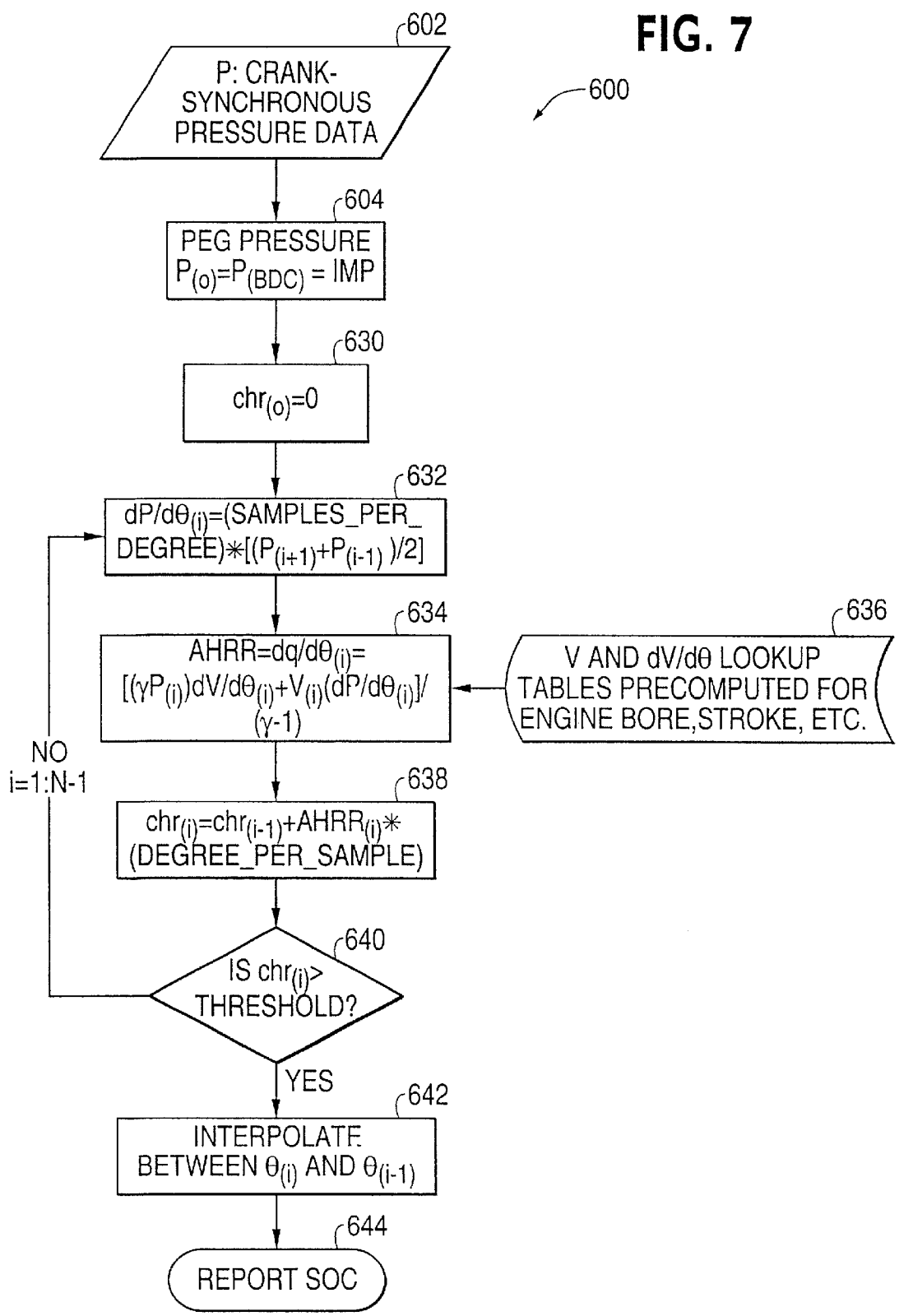
FIG. 7 is a logical flow-chart illustrating another embodiment of the present method where the cylinder pressure data is processed into a cumulative heat release (CHR) value.

A logical flow-chart of one embodiment of the present method 600 of determining a start of combustion (SOC) using a calculated CHR value in a cylinder of an internal combustion engine is graphically illustrated in FIG. 7. The illustrated embodiment comprises step 602 of obtaining cylinder pressure data (P) which corresponds to a crank shaft angle (i.e. is crank-synchronous). This cylinder pressure data P may be obtained from a pressure sensing means such as the disclosed pressure sensor 16 as shown in FIG. 2. The pressure data P from the pressure sensor 16 is graphically illustrated in FIG. 8a as line 702. As can be clearly seen, the vertical axis indicates the pressure in the cylinder as measured in pounds per square inch absolute (psia) and the horizontal axis indicates the respective crank shaft angle at which the pressure data was measured. In step 604, an initial cylinder pressure data ($P_{(0)}$) is determined which in the present embodiment, may be the intake manifold pressure absolute (IMP) when the piston is at a bottom dead center (BDC) position in the cylinder at the beginning of the compression stroke in a four stroke engine (i.e. BDC Compression). Of course, the initial $P_{(0)}$ may also be determined to be another value depending on the specific application. Then, in accordance with the present embodiment, an initial cumulative heat release ($CHR_{(0)}$) value of the cylinder being monitored is determined in step 630. While other $CHR_{(0)}$ values may be used, $CHR_{(0)}$ value of zero has been found to simplify the present method 600. In step 632, the obtained P value may then be used to calculate the $dP/d\theta_{(i)}$ value which is indicative of rate of change in pressure in the cylinder with respect to angle of the crank shaft using mathematical methods. For instance, as shown in step 632 of FIG. 7, the $dP/d\theta_{(i)}$ value may be calculated by using the equation:

$$dP/d\theta_{(i)}=[(P_{(i+1)}-P_{(i-1)})/2]/[(\theta_{(i+1)})/2]=(NDS/\alpha)\,[(P_{(i+1)}+P_{(i+1)})/2]$$

where

NDS=number of pressure data samples

α=degree of crank shaft rotation

P=cylinder pressure data (i)=number of iterations.

In the above equation (and all subsequent equations), (i) represents a number corresponding to the $i^{th}$ iteration of the present method which is commonly used and known in mathematics, logic and the computer art. And as the above equation indicates, the present method 600 may be an iterative process that requires more than one iteration depending on the outcome of the steps as will be discussed further below. In this regard, it is also well recognized in mathematics, logic and the computer art that (i+1) indicates the value of interest at an iteration subsequent to the present iteration i and (i−1) indicates the interested value at an iteration prior to the present iteration i. It should be recognized however, that other $dP/d\theta_{(i)}$ equations may be used which are different from the above noted equation. In this regard, the above $dP/d\theta_{(i)}$ equation is provided only as one example of how the present method 600 in accordance with one embodiment of the present invention may be practiced.

The calculated $dP/d\theta_{(i)}$ value is then used in step 634 to calculate an apparent heat release rate ($AHRR_{(i)}$) value in the cylinder which is indicative of the rate of heat released in the cylinder with respect to the angle of the crank shaft. The $AHRR_{(i)}$ value may be calculated using the equation:

$$AHRR_{(i)}=dq/d\theta_{(i)}=[(\gamma P_{(i)})(dV/d\theta_{(i)})+(V_{(i)})(dP/d\theta_{(i)})]/(\gamma-1)$$

where

γ=nominal value of ratio of specific heats (ex.: typically between 1.2 to 1.4)

P=cylinder pressure data $dV/d\theta_{(i)}$=rate of change in volume of said cylinder with respect to the angle of said crank shaft $V_{(i)}$=cylinder volume (i)=number of iterations.

It is again noted that the above equation for $AHRR_{(i)}$ is provided as an example only and other equations may also be used in accordance with the present invention. FIG. 8b provides a graphical illustration of $AHRR_{(i)}$ indicated by line 704 which is calculated utilizing the above noted equation from the pressure data line 702 graphically illustrated in FIG. 8a. As clearly shown, the vertical axis indicates the calculated $AHRR_{(i)}$ which may have the units of British Thermal Units (BTU) per crank degree while the horizontal axis indicates the corresponding crank shaft angle at which the AHRR value was calculated.

In addition, it should be noted that both $V_{(i)}$ and $dV/d\theta_{(i)}$ may be highly non-linear with the crank shaft angle in internal combustion engines. And whereas one or both of these values may be calculated since they are dependent upon the specific geometry of the cylinder including the engine bore and stroke, it has been found that the present method 600 may be completed more rapidly when these values are pre-computed and provided in a look-up table in step 636 in a manner generally known in the computer arts. In addition, because a nominal value of the ratio of specific heats (γ) is used (for instance, 1.35), there may be some reduction in the fidelity of the calculated $AHRR_{(i)}$. Correspondingly, actual values of specific heats γ may also be used depending on the application and the availability of γ data.

A cumulative heat release ($CHR_{(i)}$) value in the cylinder may then be calculated in step 638 by adding the $AHRR_{(i)}$ value to the $CHR_{(i-1)}$ value, the $CHR_{(i)}$ value being indicative of cumulative heat released in the cylinder with respect to angle of the crank shaft. In this regard, the $CHR_{(i)}$ value may be calculated using the equation:

$$CHR_{(i)}=[CHR_{(i+1)}+(AHRR)_{(i)}(\alpha/NDS)]$$

where

α=degree of crank shaft rotation

NDS=number of pressure data samples (i)=number of iterations.

Again, the above equations are provided as an example only and other equations may be used in calculating the $CHR_{(i)}$ value. FIG. 8c provides a graphical illustration of $CHR_{(i)}$ values via line 706 calculated by utilizing the equation above from the $AHRR_{(i)}$ values of line 704 illustrated in FIG. 8b. As clearly shown, the vertical axis indicates the calculated $CHR_{(i)}$ which may have the units of BTU while the horizontal axis indicates the corresponding crank angle at which the $CHR_{(i)}$ value was calculated.

In accordance with the present method, this calculated $CHR_{(i)}$ value is then compared to a predetermined threshold value in step 640. As can be seen in FIG. 7, if the $CHR_{(i)}$ value does not cross the predetermined threshold value, the above steps may then be repeated in another $i^{th}$ iteration starting from the $dP/d\theta_{(i)}$ calculation of step 632 as described above. Thus, the above iterative steps can be expressed alternatively as:

$$\text{cumulative heat release } CHR_{(i)} = (AHRR)_{(i)}(\alpha/NDS).$$

On the other hand, if the calculated $CHR_{(i)}$ value does cross the predetermined threshold value, the crank shaft location of the SOC can then be calculated by determining the precise crank shaft location where the predetermined threshold value is crossed.

FIG. 8d illustrates an enlarged view of $CHR_{(i)}$ values of FIG. 8c in relation to a predetermined threshold value illustrated by the dashed line 720 which, for the purposes of this example, is set at 0.5 BTU. As can be seen, the $CHR_{(i)}$ value increases substantially over a relatively small crank shaft angle window and also increases in a substantially linear manner thereby crossing the threshold value line 720 at the point 722 which represents the crank shaft angle where SOC occurs. Because of the linearly increasing characteristic of the $CHR_{(i)}$ values, one way of calculating the SOC crank shaft location may be through mathematical linear interpolation or other interpolation techniques in step 642. More specifically, when the CHR value does cross the threshold value, interpolation may used in step 642 between $\theta_{(i)}$ and $\theta_{(i-1)}$ to determine the crank angle of point 722, and consequently the SOC so determined can be reported in step 644.

It should again be noted that whereas in the embodiment detailed above, the SOC is derived using cylinder pressure data P which synchronously corresponds to a crank shaft angle, in other embodiments, the SOC may be derived using the cylinder pressure data P synchronized with another parameter such as time. However, the present inventors have found that crank shaft angle provides an easily measurable parameter which yields accurate results in determining SOC in accordance with the present invention. In addition, as will be explained in further detail hereinbelow in discussion of yet another embodiment of the present invention, by utilizing cylinder pressure data P which is synchronously corresponds to a crank shaft angle, the present invention for determining the start of combustion (SOC) may readily be provided with additional optional steps discussed previously including verification tests, windowing, and filtering that enhance the accuracy and efficiency of the SOC determined, as well as allowing determination of occurrence of misfire and retarded timing.

As previously noted, in the preferred embodiment, all of the calculations above may be performed by a software program within a processor such as the ECU 20 of FIG. 1. Such software programs for practicing the present method and performing mathematical calculations presented above may be implemented by one skilled in the computer art and need not be detailed here. Of course, in alternative embodiments, these calculations (or any part thereof) may be calculated using logic circuits and wiring which is also well known in the electrical art and also need not be detailed here.

Once this SOC is determined, it can be reported to the ECU 20 for use in more efficiently controlling the internal combustion engine to which the present invention is applied. For instance, when the present invention is applied to an internal combustion engine operating in a PCCI combustion mode, the determined SOC can be used by the ECU 20 to generate output signals that variably control the combustion history control system which may include one or more of a temperature control system for varying the temperature of the mixture of fuel and air, a pressure control system for varying the pressure of the mixture, an equivalence ratio control system for varying an equivalence ratio of the mixture or a mixture autoignition property control system for varying an autoignition property of the mixture as noted previously. Thus, because the present method allows accurate measurement of SOC, it advantageously allows a closed-loop control of combustion of an internal combustion engine such as a PCCI engine to ideally maintain the SOC to achieve optimum PCCI combustion. Of course, it should be again appreciated that the present invention can also be applied to other internal combustion engines previously noted as well.

Figure 9A:
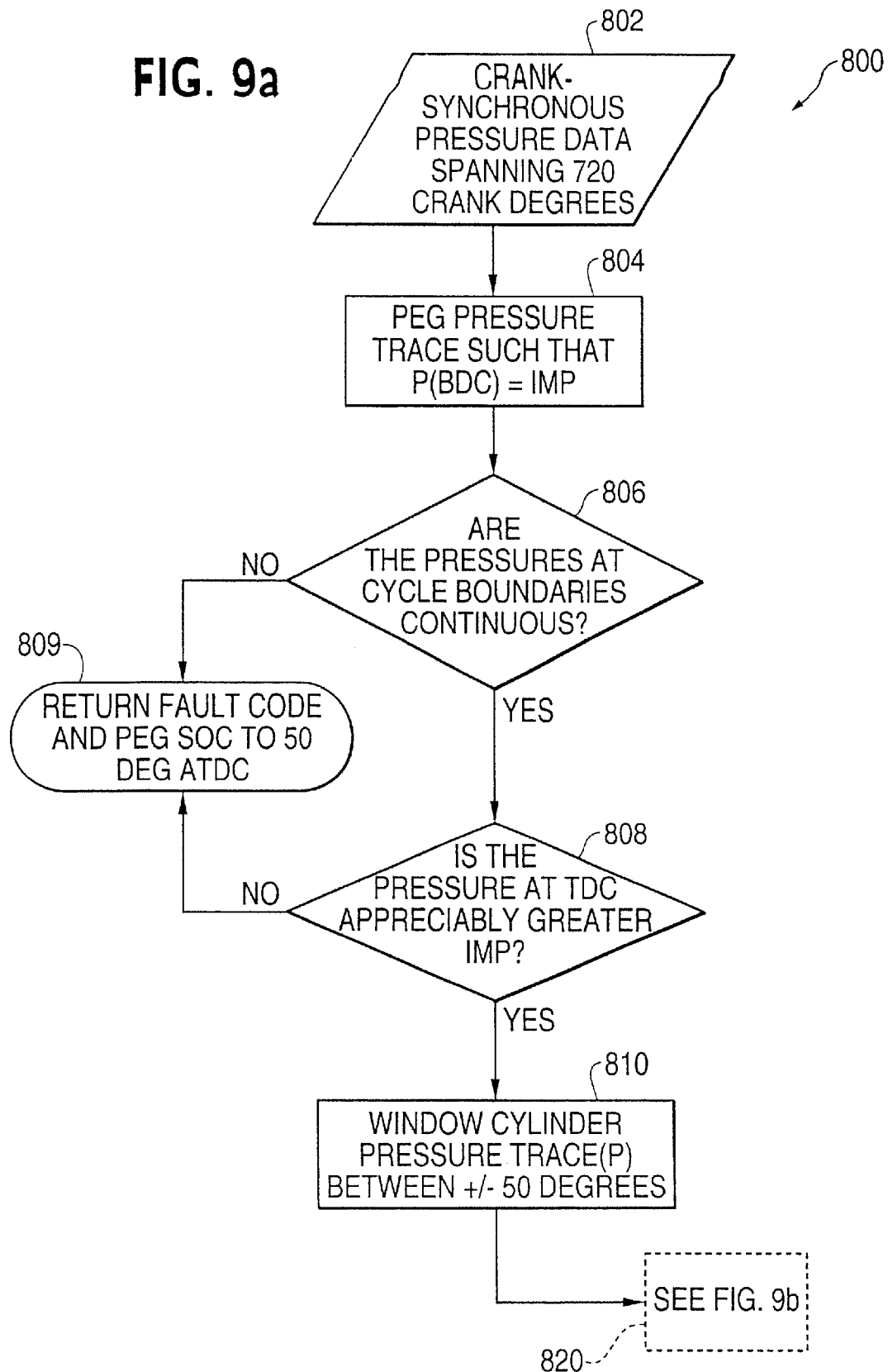
FIG. 9a which is continued on FIG. 9b are logical flow-charts illustrating another embodiment of the present method that incorporates optional steps including verification tests, windowing, filtering and misfire test that enhance the accuracy and efficiency of the SOC determined.
Figure 9B:
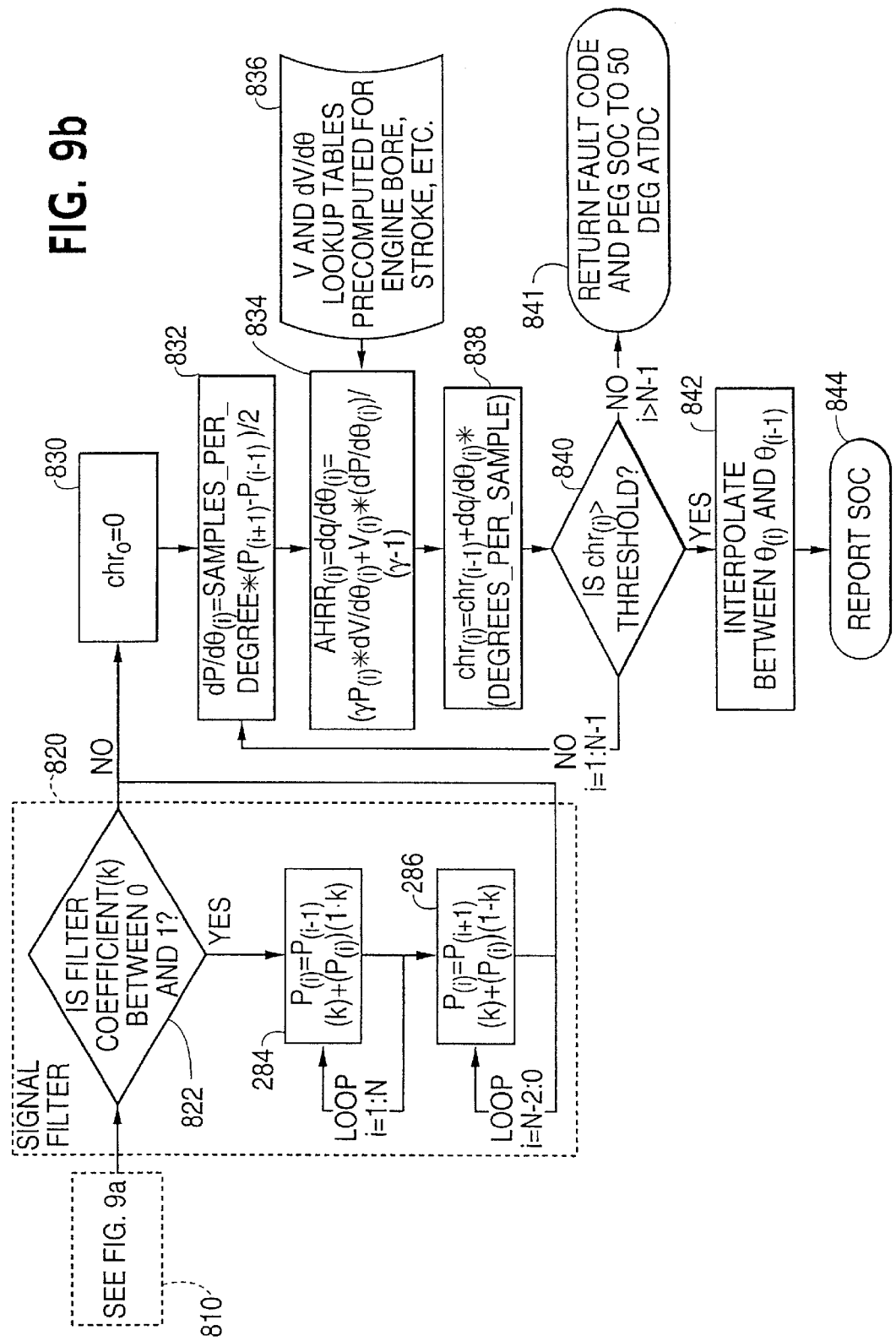

As also previously noted, the present method 600 for determining the start of combustion (SOC) shown in FIG. 7 using a calculated CHR value may also include additional steps that further ensure the accuracy of the SOC determinations and more efficiently determine the SOC. In this regard, a detailed logical flow-chart of another preferred embodiment of the present method 800 is illustrated in FIGS. 9a and 9b which are expansion of the embodiment shown in FIG. 7 but showing the optional steps of verification, windowing, filtering and misfire determination. As illustrated in FIG. 9a, the present embodiment obtains crank-synchronous pressure data (P) in step 802 spanning 720 crank degrees which correspond to conventional internal combustion engines using a four stroke combustion cycle. Of course, other crank degrees may be used depending on the cycle of the engine including 360 crank degrees when applied to an engine using a two stroke combustion cycle. In step 804, the initial cylinder pressure ($P_{(o)}$) may be determined to be the intake manifold pressure (IMP) when the piston is at bottom dead center (BDC Compression) position in the cylinder before the compression stroke of the piston.

At this point, the preferred embodiment of the present method 800 as illustrated in FIG. 9a checks and verifies the integrity of the pressure data signal before proceeding to the next step and before performing any numeric calculations. In this regard, two distinct signal verification tests may be performed in steps 806 and 808. The first verification test of step 806 monitors the continuity of the pressure data signal across a bottom dead center (BDC Compression) boundary of the piston between cycles of the piston and provides a fault signal in step 809 if the pressure data signal across the BDC boundary is not continuous. This can be attained by taking two pressure measurements 720° apart from each other (in terms of crank rotation angle) in a four stroke engine and 360° apart from each other in a two stroke engine. This verification test is performed since the pressure data signal will not be continuous at the BDC boundary between the cycles if the pressure sensor 16 of FIG. 1 has drifted or has been reset mid-sampling. Upon providing a fault signal in step 809, the first verification test of step 806 may also define the SOC crank shaft position to be a default angle, such as 50 degrees after top dead center (TDC) position of the piston. Of course, different default angles may also be used depending upon the specific engine geometry and the application.

A second verification test may be provided in step 808 in addition to, or in lieu of, the above first verification test. The second verification test of step 808 compares P measured when the piston is at the TDC position with P measured when the piston is at the BDC position and provides a fault signal in step 809 if the P measured at TDC is not substantially greater than P measured at BDC position (i.e. $P_{(TDC)} >> P_{(BDC)}$). Like the first verification test in step 806, the second verification test of step 808 may also define the SOC crank shaft location to be a default crank angle, such as 50 degrees after TDC, upon providing the fault signal in step 809. This second verification test of step 808 may be performed since the pressure data signal will be "flat" across the region of interest if the pressure sensor 16 or an associated signal amplifier (not shown) fails. And in addition to the above two verification tests of steps 806 and 808, additional tests on the pressure data signal integrity could be incorporated into the present method for determining SOC, for example, verifying the compression line in log(P) and log(V) space.

In experimenting with the embodiments of the present invention, it has been found that with respect to the embodiment where CHR is used to determine SOC, data sampling over the complete engine cycle and calculating the required values such as $dP/d\theta_{(i)}$, $AHRR_{(i)}$ and $CHR_{(i)}$ may slow down the pressure measurement process and require calculation of very large quantity of data which may not be relevant to the combustion event of interest, namely the SOC. In this regard, the pressure data P may also be windowed in step 810 in the preferred embodiment to improve execution speed and to minimize data calculation. Of course, it is also preferable to provide the window such that the window contains the SOC pressure data. For example, a window of +/−50 crank degrees around the combustion event may be used in step 810 of the present embodiment. Of course, this +/−50 crank degree window may be modified depending on the specifics of any given engine and the characteristics of the combustion within the engine. In addition, depending on the type of pressure sensor used, the sensor can be "pegged" or otherwise calibrated to compensate for drift, etc. in any appropriate manner.

As can also be seen in FIG. 9b, the present method 800 also includes a filtering step 820 where the pressure data signal is filtered prior to computing the apparent heat release rate ($AHRR_{(i)}$) value in subsequent steps. Initially, the filter coefficient "k" may optionally be confirmed to be within a predetermined range in step 822 such as between 0 and 1. A two-pass forward difference filter 284 and/or backward difference filter 286 with filter coefficient "k" between 0 and 1 may then be used to preserve crank angle information in the filtered pressure data signal. For instance, a forward difference filter 284 may be defined by the equation:

$$P_{(i)} = (P_{(i-1)})(k) + (P_{(i)})(1-k)$$

while the backward difference filter 286 may be defined by the equation:

$$P_{(i)} = (P_{(i+1)})(k) + (P_{(i)})(1-k)$$

where $P_{(i)}$=filtered cylinder pressure data
k=filter coefficient
(i)=number of iterations.
And while the $AHRR_{(i)}$ value may be sensitive to the filter coefficient k, the $CHR_{(i)}$ is relatively unaffected. It should also be noted that the execution speed of the present preferred method may be increased by bypassing the above noted filtering steps by intentionally specifying an invalid filter coefficient such as a coefficient k exceeding 1. Of course, step 822 and the above signal filters are provided as examples only and other signal filters with different filter coefficients and ranges may be used depending upon the output of the sensor that is used and the signal requirements of the ECU 20. In this regard, the pressure data signal of the present invention may also be conditioned or processed using analog filters to smooth cylinder pressure traces, and differential filters to cut down processing needs, the differential filters having phase lag compensation and where the phase lag is tabulated in an engine look up table or the like. It is also noted that whereas the above discussion only briefly discusses the details of the additional signal processing steps, such signal processing methods are generally known in the electrical and computer arts and therefore, need not be discussed in detail here. Moreover, it should also be appreciated that these additional steps, as well as others, may very well be also performed by the software provided in the ECU 20.

After the filtering of the pressure data signal, the $CHR_{(i)}$ may be initially set to zero in step 830 and the SOC within a given cylinder may be determined utilizing the embodiment of FIG. 7 discussed above. More specifically, the pressure change rate ($dP/d\theta_{(i)}$) value is determined in step 832, and the apparent heat release rate ($AHRR_{(i)}$) value is calculated in step 834 utilizing data from data look-up tables in step 836. Then, the cumulative heat release ($CHR_{(i)}$) value is calculated in step 834 as previously described and is compared to a threshold value in step 840 to determine whether SOC has occurred. At this point, the preferred embodiment of the present invention may also include an additional step 841 of monitoring misfire in the engine by providing a misfire fault signal when the $CHR_{(i)}$ fails to cross the predetermined threshold within the predetermined crank shaft angle window which indicates that combustion has not occurred and that misfire has occurred. If this condition arises, the SOC crank shaft location is set to be a predetermined angle such as 50 degrees after TDC position of the piston. Otherwise, the analysis is iteratively repeated from step 832 as shown in FIG. 9b until SOC or misfire is determined to have occurred. If occurrence of SOC is determined, the crank angle location is determined in step 842 by mathematical interpolation and is reported in step 844.

Thus, the above discussed additional steps including the verification tests, windowing, various filtering, and the misfire test are all optional steps which may be included in practicing the present invention to enhance the accuracy of the SOC determined. And like the previously disclosed embodiment, once the SOC is determined, it may be used by the ECU 20 to more precisely control the combustion in an internal combustion engine to which the present invention is applied. In particular, in the embodiment where the present invention is applied especially advantageously to a PCCI combustion engine, the determined SOC may be readily used to generate output signals to variably control the combustion history control system such as a temperature control system for varying the temperature of the mixture of fuel and air, a pressure control system for varying the pressure of the mixture, an equivalence ratio control system for varying an equivalence ratio of the mixture and/or a mixture autoignition property control system for varying an autoignition property of the mixture.

It should also be noted that whereas the specific embodiments of the present invention discussed above have been directed to methods for determining SOC, the present invention is not limited to such methods but is also directed to apparatus for determining SOC in the manner described. In this regard, such an apparatus may include a pressure sensing means such as the pressure sensor 16 and a processor such as the ECU 20, both of FIG. 1, to attain the above noted advantages to process the pressure signal into a processed pressure signal, to compare the processed pressure signal to a predetermined threshold value, to determine that SOC has occurred if the processed pressure signal crosses the predetermined threshold value, and to calculate crank shaft location at which SOC occurred. As previously described, the pressure sensing means may be one or more of a pressure sensor, accelerometer, ion probe, optical diagnostic, strain gage, load washer, fast thermocouple, torque sensor, RPM sensor and emissions sensor. Moreover, the apparatus in accordance with the present invention may be provided in a diesel engine, a spark ignited engine, a flexible fuel engine, a premixed charge compression ignition (PCCI) engine, and variations thereof which may operate in a modified thermal cycle, but is especially advantageous when applied to a premixed charge compression ignition (PCCI) engine. In this regard, if the engine to which the present invention is applied includes a combustion history control system, the processor may be used to variably control the combustion history control system based on the calculated SOC.

From the foregoing, it should now be apparent how the present invention provides an apparatus and a method of effectively determining the start of combustion in an internal combustion engine. In addition, it can be seen how the present invention provides a method for ensuring the integrity of the SOC determinations. Furthermore, it can be seen how the present invention affords a method of determining any occurrence of misfire in the internal combustion engine.

While various embodiments in accordance with the present invention have been described, the present invention is not limited thereto. Various modifications, variations and additions will now become evident to persons skilled in the art. Therefore, the present invention is not limited to the details shown and described herein, but includes all such modifications, variations and additions.

Industrial Applicability

The present invention will find applicability in a wide range of applications that utilize an internal combustion engine in which the determination of start of combustion is important.

What is claimed is:

1. A method of determining occurrence of a start of combustion (SOC) in a cylinder of an internal combustion engine having a crankshaft comprising steps of:
   obtaining cylinder pressure data (P);
   processing said cylinder pressure data (P) into a processed pressure value indicative of the occurrence of SOC;
   comparing said processed pressure value to a predetermined threshold value;
   if said processed pressure value crosses said predetermined threshold value, determining that SOC has occurred; and
   calculating a crank shaft location at which said predetermined threshold value was crossed by said processed pressure value thereby identifying the crank shaft location at which SOC occurred.

2. The method of claim 1, further including a verification step to ensure integrity of said cylinder pressure data (P) so that said cylinder pressure data (P) is able to b processed into said processed pressure value indicative of the occurrence of SOC.

3. The method of claim 2, wherein said verification step includes monitoring continuity of said cylinder pressure data (P) across a bottom dead center boundary of a reciprocally mounted piston in said cylinder.

4. The method of claim 3, further including the step of providing a fault signal if said cylinder pressure data across said bottom dead center boundary is not continuous.

5. The method of claim 2, wherein said verification step includes comparing P measured when a reciprocally mounted piston in said cylinder is at a top dead center position with P measured when said piston is at a bottom dead center position.

6. The method of claim 5, further including the step of providing a fault signal if said P measured at said top dead center is not substantially greater than said P measured at bottom dead center position.

7. The method of claim 1, wherein said cylinder pressure data (P) is synchronized to an angle of a crank shaft, and further including the step of windowing said cylinder pressure data (P) within a predetermined crank shaft angle window which is inclusive of said start of combustion (SOC).

8. The method of claim 7, wherein said predetermined crank shaft angle window is between −180 and +180 crank shaft degrees from top dead center of a piston in said cylinder.

9. The method of claim 8, wherein said predetermined crank shaft angle window is between −50 and +50 crank shaft degrees from top dead center of a piston in said cylinder.

10. The method of claim 9, wherein said predetermined crank shaft angle window is between −10 and +30 crank shaft degrees from top dead center of a piston in said cylinder.

11. The method of claim 1, further including the step of filtering at least one of said cylinder pressure data (P) and said processed pressure value.

12. The method of claim 11, wherein said processed pressure value is filtered cylinder pressure data (P).

13. The method of claim 11 wherein said step of filtering is attained by at least one of an analog filter and a digital filter.

14. The method of claim 13, wherein said at least one of an analog filter and a digital filter has a cutoff frequency inversely proportional to at least one of bore size of said cylinder of said engine and a bowl size of a piston received within said cylinder of said engine.

15. The method of claim 13, wherein said at least one of an analog filter and a digital filter has a cutoff frequency of approximately 11,000 Hz/(diameter of said cylinder).

16. The method of claim 1, further including the step of determining occurrence of misfire.

17. The method of claim 16, wherein misfire is determined to have occurred when said processed pressure value does not cross said predetermined threshold within a predetermined crank shaft angle window.

18. The method of claim 17, further including the step of providing a misfire fault signal upon determining occurrence of misfire.

19. The method of claim 17, further including the step of defining said SOC crank shaft location to be a predetermined angle upon providing said misfire fault signal.

20. The method of claim 19, wherein said predetermined angle is 50 degrees after top dead center position of a piston reciprocally mounted in said cylinder.

21. The method of claim 16, wherein said cylinder pressure data (P) is synchronized to an angle of a crank shaft, and occurrence of misfire is determined by calculation of a pressure ratio (PR) defined as:

$$PR_{(\theta)} = P_{(\theta)}/P_{(-\theta)}$$

where θ is a crank angle between 10° to 45°, wherein if said $PR_{(\theta)}$ is not greater than a reference level, a misfire is determined to have occurred.

22. The method of claim 1, wherein said cylinder pressure data (P) is synchronized to an angle of a crank shaft, further including the step of determining existence of retarded timing by comparing a pressure ratio (PR) to a predetermined expected PR value, said pressure ratio being defined as:

$$PR_{(\theta)} = P_{(\theta)}/P_{(-\theta)}$$

where θ is a crank angle between 10° to 45°.

23. The method of claim 1, wherein at least one of said steps are performed by a processor.

24. The method of claim 23, wherein said processor includes an electronic control unit (ECU).

25. The method of claim 24, wherein said step of obtaining cylinder pressure data (P) is attained by a pressure sensing means that generates a pressure data signal indicative of pressure in said cylinder to said processor.

26. The method of claim 25, wherein said pressure sensing means includes at least one of a pressure sensor, accelerometer, ion probe, optical diagnostic, strain gage, load washer fast thermocouple, torque sensor, RPM sensor and emissions sensor.

27. The method of claim 26, wherein said pressure sensing means is a pressure sensor.

28. The method of claim 1, wherein said engine is one of a diesel engine, a spark ignited engine, a flexible fuel engine, and a premixed charge compression ignition (PCCI) engine.

29. The method of claim 28, wherein said engine is a premixed charge compression ignition (PCCI) engine.

30. The method of claim 1, wherein said processed pressure value is a cylinder pressure and said predetermined threshold value is an isentropic compression pressure value.

31. The method of claim 1, wherein said cylinder pressure data (P) is synchronized to an angle of a crank shaft, and said step of processing said cylinder pressure data (P) into a processed pressure value includes the step of calculating a pressure change rate.

32. The method of claim 31, wherein said pressure change rate is dP/dθ value indicative of rate of change in pressure in said cylinder with respect to an angle of said crank shaft.

33. The method of claim 31, wherein said pressure change rate is dP/dt value indicative of rate of change in pressure in said cylinder with respect to time.

34. The method of claim 31, wherein said step of processing said cylinder pressure data (P) further includes the step of determining a peak pressure change rate (PPCR).

35. The method of claim 34, wherein said peak pressure change rate (PPCR) is said processed pressure value which is compared to said predetermined threshold value.

36. The method of claim 34, further including the step of comparing said peak pressure change rate (PPCR) with a minimum pressure change rate, and determining that a misfire has occurred if said PPCR is substantially similar to said minimum pressure change rate.

37. The method of claim 34, further including the step of comparing said peak pressure change rate (PPCR) with a minimum pressure change rate, and determining that advanced combustion exists if said PPCR is substantially greater than said minimum pressure change rate.

38. The method of claim 1, wherein said cylinder pressure data (P) is synchronized to an angle of a crank shaft, and said step of processing said cylinder pressure data (P) into a processed pressure value includes the step of calculating a pressure change acceleration rate.

39. The method of claim 38, wherein said pressure change acceleration rate is $(d^2P/d\theta^2)$ indicative of acceleration of pressure in said cylinder with respect to angle of said crank shaft.

40. The method of claim 38, wherein said pressure change acceleration rate is $(d^2P/d^2)$ value indicative of acceleration of pressure in said cylinder with respect to time.

41. The method of claim 38, wherein said pressure change acceleration rate is obtained by processing said cylinder pressure data (P) utilizing a software program executed by a processor.

42. The method of claim 38, wherein said pressure change acceleration rate is obtained by processing said cylinder pressure data (P) utilizing at least one differentiator circuit having an operational amplifier.

43. The method of claim 42, wherein said pressure change acceleration rate is obtained by processing said cylinder pressure data (P) utilizing two differentiator circuits in series.

44. The method of claim 38, wherein said pressure change acceleration rate is further processed using at least one of a filter, a level shifter, and a comparator.

45. The method of claim 44, wherein said step of comparing said processed pressure value to said predetermined threshold value is attained utilizing a comparator circuit.

46. The method of claim 1, wherein said cylinder pressure data (P) is synchronized to an angle of a crank shaft, and said step of processing said cylinder pressure data (P) into a processed pressure value includes the step of calculating an apparent heat release rate $(AHRR_{(i)})$ value in said cylinder based on said cylinder pressure data P, said $AHRR_{(i)}$ value indicative of the rate of heat released in said cylinder with respect to angle of said crank shaft.

47. The method of claim 46, further including the step of calculating a pressure change rate $(dP/d\theta_{(i)})$ value indicative of rate of change in pressure in said cylinder with respect to angle of said crank shaft.

48. The method of claim 47, wherein said apparent heat release rate $(AHRR_{(i)})$ value is calculated based on said $dP/d\theta_{(i)}$ value.

49. The method of claim 48, further including the step of calculating a cumulative heat release $(CHR_{(i)})$ value in said cylinder based on said $AHRR_{(i)}$ value, said $CHR_{(i)}$ value indicative of cumulative heat released in said cylinder with respect to angle of said crank shaft.

50. The method of claim 49, further including the step of comparing said $CHR_{(i)}$ value to said predetermined threshold value and if said calculated $CHR_{(i)}$ value crosses said predetermined threshold value, determining that said SOC has occurred and calculating angle of said crank shaft at which said predetermined threshold value is crossed.

51. An apparatus for determining occurrence of a start of combustion (SOC) in a cylinder of an engine having a crankshaft comprising:

a pressure sensing means for sensing pressure in said cylinder and providing a pressure signal indicative of said pressure in said cylinder;

a processor that receives said pressure signal from said pressure sensing means, processes said pressure signal into a processed pressure signal, compares said processed pressure signal to a predetermined threshold value, determines that SOC has occurred if said processed pressure signal crosses said predetermined threshold value; and a sensor adapted to monitor location of said crank shaft to allow said processor to calculate crank shaft location at which SOC occurred.

52. The apparatus of claim 51, wherein said processor is further adapted to perform a verification test to ensure integrity of said cylinder pressure signal so that said cylinder pressure signal is able to be processed into said processed pressure signal indicative of the occurrence of SOC.

53. The apparatus of claim 52, wherein said verification test monitors continuity of said cylinder pressure signal across a bottom dead center boundary of a reciprocally mounted piston in said cylinder between cycles, and said processor provides a fault signal if said cylinder pressure data across said bottom dead center boundary is not continuous.

54. The apparatus of claim 52, wherein said verification test compares cylinder pressure signal measured when a reciprocally mounted piston in said cylinder is at a top dead center position with cylinder pressure signal measured when said piston is at a bottom dead center position, and said processor provides a fault signal if said pressure signal measured at said top dead center is not substantially greater than said cylinder pressure signal measured at bottom dead center position.

55. The apparatus of claim 51, wherein said cylinder pressure signal is synchronized to an angle of a crank shaft, and said processor is further adapted to window said pressure signal within a predetermined crank shaft angle window which is inclusive of said start of combustion (SOC).

56. The apparatus of claim 55, wherein said predetermined crank shaft angle window is between −180 and +180 crank shaft degrees from top dead center of a piston in said cylinder.

57. The apparatus of claim 56, wherein said predetermined crank shaft angle window is between −50 and +50 crank shaft degrees from top dead center of a piston in said cylinder.

58. The apparatus of claim 57, wherein said predetermined crank shaft angle window is between −10 and +30 crank shaft degrees from top dead center of a piston in said cylinder.

59. The apparatus of claim 51, further comprising a filter to filter at least one of said pressure signal and said processed pressure signal to thereby facilitate said determination of occurrence of SOC.

60. The apparatus of claim 59, wherein said filter is at least one of an analog filter and a digital filter.

61. The apparatus of claim 60, wherein said at least one of an analog filter and a digital filter has a cutoff frequency inversely proportional to at least one of bore size of said cylinder of said engine and a bowl size of a piston received within said cylinder of said engine.

62. The apparatus of claim 60, wherein said at least one of an analog filter and a digital filter has a cutoff frequency of approximately 11,000 Hz/(diameter of said cylinder).

63. The apparatus of claim 51, wherein said processor is further adapted to determine occurrence of misfire.

64. The apparatus of claim 63, wherein said processor provides a misfire fault signal upon determining occurrence of misfire, said misfire being determined to have occurred when said processed pressure signal does not cross said predetermined threshold within a predetermined crank shaft angle window.

65. The apparatus of claim 64, wherein said processor defines said SOC crank shaft location to be a predetermined angle upon providing said misfire fault signal.

66. The apparatus of claim 65, wherein said predetermined angle is 50 degrees after top dead center position of a piston reciprocally mounted in said cylinder.

67. The apparatus of claim 63, wherein said pressure signal is synchronized to an angle of a crank shaft, and said processor determines occurrence of misfire by calculating a pressure ratio (PR) defined as:

$$PR_{(\theta)} = P_{(\theta)}/P_{(-\theta)}$$

where θ is a crank angle between 10° to 45°, wherein if said $PR_{(\theta)}$ is not greater than a reference level, a misfire is determined to have occurred.

68. The apparatus of claim 51, wherein said cylinder pressure signal is synchronized to an angle of a crank shaft, and said processor determines existence of retarded timing by comparing a pressure ratio (PR) to a predetermined expected PR value, said pressure ratio being defined as:

$$PR_{(\theta)} = P_{(\theta)}/P_{(-\theta)}$$

where θ is a crank angle between 10° to 45°.

69. The apparatus of claim 51, wherein said processor includes an electronic control unit (ECU).

70. The apparatus of claim 51, wherein said pressure sensing means includes at least one of a pressure sensor, accelerometer, ion probe, optical diagnostic, strain gage, load washer, fast thermocouple, torque sensor, RPM sensor and emissions sensor.

71. The apparatus of claim 70, wherein said pressure sensing means is a pressure sensor.

72. The apparatus of claim 51, wherein said engine is one of a diesel engine, a spark ignited engine, a flexible fuel engine, and a premixed charge compression ignition (PCCI) engine.

73. The apparatus of claim 72, wherein said engine is a premixed charge compression ignition (PCCI) engine.

74. The apparatus of claim 73, wherein said engine includes a combustion history control system, and said processor variably controls said combustion history control system based on said calculated SOC.

75. The apparatus of claim 51, wherein said processed pressure signal is indicative of a cylinder pressure.

76. The apparatus of claim 51, wherein said cylinder pressure signal is synchronized to an angle of a crank shaft and is processed into a pressure change rate.

77. The apparatus of claim 76, wherein said pressure change rate is (dP/dθ) indicative of rate of change in pressure in said cylinder with respect to an angle of said crank shaft.

78. The apparatus of claim 76, wherein said pressure change rate is (dP/dt) indicative of rate of change in pressure in said cylinder with respect to time.

79. The apparatus of claim 76, wherein said processed pressure value is a cylinder pressure and said predetermined threshold value is an isentropic compression pressure value.

80. The apparatus of claim 79, wherein said predetermined threshold is a minimum pressure change rate and said PPCR is compared to said minimum pressure change rate.

81. The apparatus of claim 80, wherein if said peak pressure change rate (PPCR) is substantially similar to an absolute value of said minimum pressure change rate, determining that a misfire has occurred.

82. The apparatus of claim 80, wherein if said peak pressure change rate is substantially greater than said minimum pressure change rate, determining that an extremely advanced combustion has occurred.

83. The apparatus of claim 51, wherein said cylinder pressure data (P) is synchronized to an angle of a crank shaft, and said processing means is adapted to calculate a pressure change acceleration rate from said pressure signal.

84. The apparatus of claim 83, wherein said pressure change acceleration rate is ($d^2P/d\theta^2$) which is indicative of acceleration of pressure in said cylinder with respect to angle of said crank shaft.

85. The apparatus of claim 83, wherein said pressure change acceleration rate is ($d^2P/dt^2$) value indicative of acceleration of pressure in said cylinder with respect to time.

86. The apparatus of claim 83, further including a software program executed by said processor that processes said cylinder pressure signal to provide said pressure change acceleration rate.

87. The apparatus of claim 83, further including at least one differentiator circuit having an operational amplifier that processes said cylinder pressure signal to provide said pressure change acceleration rate.

88. The apparatus of claim 87, wherein said at least one differentiator circuit is two differentiator circuits in series.

89. The apparatus of claim 83, further including at least one of a filter, a level shifter, and a comparator that further processes said pressure change acceleration rate.

90. The apparatus of claim 83, further including a comparator circuit adapted to compare said processed pressure signal to said predetermined threshold value.

91. The apparatus of claim 51, wherein said cylinder pressure signal is synchronized to an angle of a crank shaft and is processed into an apparent heat release rate (AHRR$_{(1)}$) indicative of the rate of heat released in said cylinder with respect to angle of said crank shaft.

92. The apparatus of claim 91, wherein said cylinder pressure signal is further processed into a pressure change rate ($dP/d\theta_{(i)}$) indicative of rate of change in pressure in said cylinder with respect to angle of said crank shaft.

93. The apparatus of claim 92, wherein said apparent heat release rate (AHRR$_{(i)}$) is calculated based on said pressure change rate ($dP/d\theta_{(i)}$).

94. The apparatus of claim 93, wherein said processor calculates a cumulative heat release (CHR$_{(i)}$) in said cylinder based on said apparent heat release rate (AHRR$_{(i)}$), said CHR$_{(i)}$ being indicative of cumulative heat released in said cylinder with respect to angle of said crank shaft.

95. The apparatus of claim 94, wherein said CHR$_{(i)}$ is said processed pressure signal which is compared to said predetermined threshold value by said processor.

96. The apparatus of claim 95, wherein said processor is further adapted to perform a verification test to ensure integrity of said cylinder pressure signal by monitoring continuity of said cylinder pressure signal across a bottom dead center boundary of a reciprocally mounted piston in said cylinder between cycles, and said processor provides a fault signal if said cylinder pressure data across said bottom dead center boundary is not continuous.

97. The apparatus of claim 51, wherein said processor determines an initial cylinder pressure (P$_{(0)}$), determines an initial cumulative heat release (CHR$_{(0)}$) value, calculates a pressure change rate ($dP/d\theta_{(i)}$) value in said cylinder indicative of rate of change in pressure with respect to an angle of said crank shaft, calculates an apparent heat release rate (AHRR$_{(i)}$) value of said cylinder utilizing said pressure change rate ($dP/d\theta_{(i)}$) value, calculates a cumulative heat release (CHR$_1$)) value of said cylinder by adding said AHRR$_{(i)}$ value to a CHR$_{(i-1)}$ value, compares said CHR$_{(i)}$ value to said predetermined threshold value, repeats said calculation until said calculated CHR$_{(i)}$ value crosses said predetermined threshold value, and calculates a SOC crank shaft location in which said predetermined threshold value is crossed.

98. The apparatus of claim 97, wherein said pressure sensing means includes at least one of a pressure sensor, accelerometer, ion probe, optical diagnostic, strain gage, load washer, fast thermocouple, torque sensor, RPM sensor and emissions sensor.

99. The apparatus of claim 98, wherein said pressure sensing means is a pressure sensor.

100. The apparatus of claim 97, wherein said engine is one of a diesel engine, a spark ignited engine, a flexible fuel engine, and a premixed charge compression ignition (PCCI) engine.

101. The apparatus of claim 100, wherein said engine is a premixed charge compression ignition (PCCI) engine.

* * * * *